US009336746B2

(12) United States Patent
Oda

(10) Patent No.: US 9,336,746 B2
(45) Date of Patent: May 10, 2016

(54) IMAGE DISPLAY DEVICE AND CONTROL METHOD THEREOF

(71) Applicant: CANON KABUSHIKI KAISHA, Tokyo (JP)

(72) Inventor: Shinya Oda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 14/183,880

(22) Filed: Feb. 19, 2014

(65) Prior Publication Data

US 2014/0240341 A1 Aug. 28, 2014

(30) Foreign Application Priority Data

Feb. 25, 2013 (JP) ................................ 2013-034802
Mar. 11, 2013 (JP) ................................ 2013-047564

(51) Int. Cl.

*G09G 5/02* (2006.01)
*G09G 3/14* (2006.01)
*H04N 1/60* (2006.01)
*H04N 5/66* (2006.01)
*G09G 3/36* (2006.01)
*G09G 3/34* (2006.01)

(52) U.S. Cl.

CPC .. *G09G 5/02* (2013.01); *G09G 3/36* (2013.01); *G09G 3/3406* (2013.01); *G09G 2320/028* (2013.01); *G09G 2320/0693* (2013.01); *G09G 2340/14* (2013.01); *G09G 2354/00* (2013.01)

(58) Field of Classification Search

CPC combination set(s) only.
See application file for complete search history.

(56) References Cited

U.S. PATENT DOCUMENTS

2005/0174610 A1* 8/2005 Fukawa ........................ 358/461
2007/0263265 A1* 11/2007 Sekine ........................ 358/518
2008/0260242 A1* 10/2008 MacKinnon et al. ......... 382/162
2009/0067016 A1* 3/2009 Manabe ........................ 358/518
2009/0201309 A1* 8/2009 Demos ........................ 345/589
2009/0310133 A1* 12/2009 Ogino et al. .................. 356/310
2011/0255303 A1* 10/2011 Nichol et al. ................. 362/606
2012/0092748 A1* 4/2012 Ostergaard et al. ........... 359/290
2012/0206050 A1* 8/2012 Spero ........................ 315/152
2013/0069970 A1* 3/2013 Sasaki et al. .................. 345/589
2013/0218240 A1* 8/2013 Feng et al. ..................... 607/90
2014/0043847 A1* 2/2014 Yang et al. .................... 362/606

FOREIGN PATENT DOCUMENTS

JP 2006-253502 A 9/2006
JP 2007-264659 A 10/2007

* cited by examiner

*Primary Examiner* — Wesner Sajous

(74) *Attorney, Agent, or Firm* — Fitzpatrick, Cella, Harper & Scinto

(57) ABSTRACT

An image display device is provided in which a difference in color appearance between visual angles can be reduced. The image display device includes: a light-emitting unit including a first light source configured such that a peak wavelength of a spectral spectrum of the light source is within a wavelength region in which a difference between color matching functions of different visual angles is small and a second light source that differs from the first light source; a control unit configured to switch a light source to be lighted to one of the first light source and the second light source based on an instruction; and a display panel that is illuminated by the light-emitting unit.

9 Claims, 27 Drawing Sheets

| LED (A) | LIGHTING STATE | LED (B) | LIGHTING STATE |
|---|---|---|---|
| R1 | LIGHTED | R2 | TURNED OFF |
| G1 | LIGHTED | G2 | TURNED OFF |
| B1 | LIGHTED | B2 | TURNED OFF |
WIDE COLOR GAMUT MODE
Fig.10A
| LED (A) | LIGHTING STATE | LED (B) | LIGHTING STATE |
|---|---|---|---|
| R1 | TURNED OFF | R2 | LIGHTED |
| G1 | TURNED OFF | G2 | LIGHTED |
| B1 | TURNED OFF | B2 | LIGHTED |
COLOR DIFFERENCE REDUCTION MODE
Fig.10B
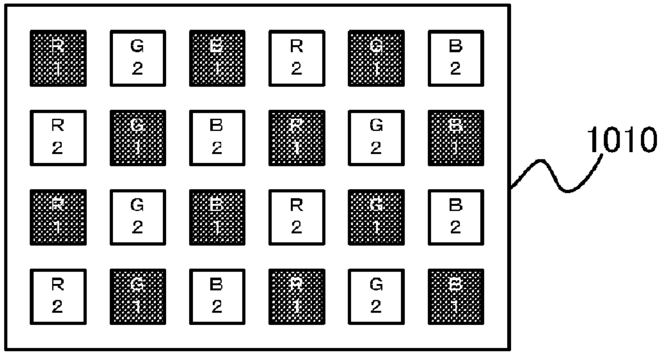
BACKLIGHT: RGB-LED (A)
Fig.10C
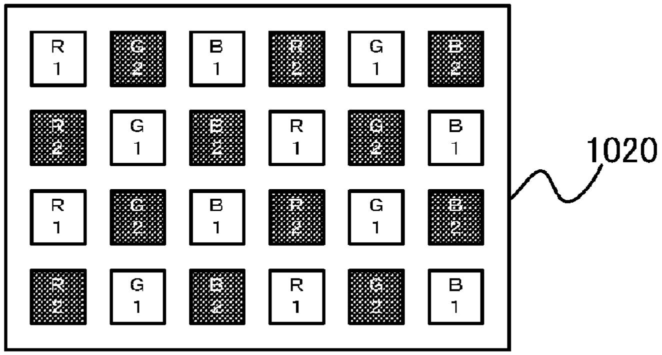
BACKLIGHT: RGB-LED (B)
Fig.10D

IMAGE DISPLAY DEVICE AND CONTROL METHOD THEREOF

BACKGROUND OF THE INVENTION

1. Field of the Invention

The present invention relates to an image display device and a control method thereof.

2. Description of the Related Art

Industrial displays such as color management displays include models equipped with a color adjusting function that is referred to as color correction (calibration) for correcting color shift due to individual variability or deterioration of a display and displaying color in an accurate manner. Soft proofing is a process which uses such color management displays that accurately display color to perform color correction and verification of a printing result on the display. Recent improvements in color reproducibility, color accuracy, and definition of displays have made soft proofing which simulates a final printing finish on a display more practical.

When a person looks at printed matter or a display and senses color, how color is sensed is known to differ depending on a size (visual angle) of an observed object projected onto the eyes. For example, when an observer views two color chips of a same color but with different sizes, the colors of the two color chips are sensed as different colors. This phenomenon is referred to as an "area effect of color". The "area effect of color" is conceivably caused by a change in visual cell sensitivity or, in other words, a spectral sensitivity curve (also referred to as a color matching function) of the eyes in accordance with visual angles. A color (stimulus value) as sensed by a person is determined by the multiplication of a spectral spectrum of an object and a color matching function. Since color matching functions change when viewing color chips with different sizes, the colors sensed by an observer differ even when the color chips share the same color. The International Commission on Illumination (abbreviated as CIE) defines two color matching functions: a color matching function for a 2-degree visual angle (CIE 1937 standard colorimetric observer) and a color matching function for a 10-degree visual angle (CIE 1964 supplementary standard colorimetric observer).

A mechanism by which a person senses color that is displayed on a display and problems arising therefrom will now be described. Visual cells in a human eye include cone cells which sense colors of red, green and blue and which differ from one another in spectral sensitivity. Accordingly, a person perceives color by adding up magnitudes of sensations of red, green and blue in the brain. A curve that is traced by respective sensitivities (spectrum stimulus values) of red, green and blue of the eye with respect to an equal energy spectrum is referred to as a color matching function. The sensitivity of red is denoted by x(λ), the sensitivity of green by y(λ), and the sensitivity of blue by z(λ). FIG. 3 shows color matching functions of a 2-degree visual field and a 10-degree visual field. The color matching function of the 2-degree visual field is expressed as $x_2(\lambda)$, $y_2(\lambda)$, $z_2(\lambda)$, and the color matching function of the 10-degree visual field is expressed as $x_{10}(\lambda)$, $y_{10}(\lambda)$, $z_{10}(\lambda)$. Ultimately, color as sensed by a person is expressed by tristimulus values of a CIE XYZ color system calculated from the color matching function x(λ), y(λ), z(λ). Among the XYZ stimulus values, X denotes a stimulus with respect to red, Y denotes a stimulus with respect to green, and Z denotes a stimulus with respect to blue. FIG. 4 is a diagram illustrating a mechanism by which a person senses color. A top left diagram shows a spectral spectrum s(λ) when a white color chip is displayed on a display having a backlight constituted by RGB LEDs. A bottom left diagram shows the color matching function x(λ), y(λ), z(λ). The three diagrams on the right show stimuli of red, green and blue as sensed by a person. Each stimulus is calculated by integrating a multiplication of a spectral spectrum and the color matching function. In this case, a sum of the stimuli is perceived as white.

Expression 1 represents an XYZ calculation formula for a 2-degree visual field and Expression 2 represents an XYZ calculation formula for a 10-degree visual field, where k denotes a coefficient.

[Expression 1]

$$X = k\sum_{\lambda}(x_{2^\circ}(\lambda)\times s(\lambda))$$

$$Y = k\sum_{\lambda}(y_{2^\circ}(\lambda)\times s(\lambda))$$

$$Z = k\sum_{\lambda}(z_{2^\circ}(\lambda)\times s(\lambda))$$

[Expression 2]

$$X' = k\sum_{\lambda}(x_{10^\circ}(\lambda)\times s(\lambda))$$

$$Y' = k\sum_{\lambda}(y_{10^\circ}(\lambda)\times s(\lambda))$$

$$Z' = k\sum_{\lambda}(z_{10^\circ}(\lambda)\times s(\lambda))$$

A significant difference between the values of XYZ and X'Y'Z' means that, when viewing a color chip displayed on a display, the color chip is recognized as colors that differ between the 2-degree visual field and the 10-degree visual field. How different the colors appear to a human eye is expressed by a color difference ΔE. ΔE denotes a Euclidean distance calculated by converting CIE XYZ into a CIE Lab color space (refer to Expression 3). A ΔE value of around 1.2 represents a range in which color chips placed side by side can be identified as a same color.

[Expression 3]

$$\Delta E_{ab}=\sqrt{(\Delta L)^2+(\Delta a)^2+(\Delta b)^2} \quad \text{(Expression 3)}$$

With soft proofing in which a final printing finish is verified on a display, stability and accuracy of color is important. Desirably, a color does not change with a magnitude (visual angle) of appearance of the color. On the other hand, there is also a need to expand a color gamut to be reproduced of the display for viewing photographs or the like rather than color stability. A color gamut to be reproduced of a liquid crystal display is determined by three factors including a spectral spectrum of a backlight, spectral transmittance characteristics of a color filter, and a spectral spectrum of a liquid crystal panel. Expanding a color gamut to be reproduced of a liquid crystal display requires preventing the occurrence of color mixing between dominant wavelengths of the respective primary colors of red, green and blue and other sub-peaks obtained by integrating a spectral spectrum of a color matching function and a spectral spectrum of the display. In other words, a color gamut to be reproduced is expanded by increasing color purity of the respective primary colors of red, green and blue. However, as shown in FIG. 14, a spectral spectrum of a cold cathode fluorescent lamp (CCFL) that is widely used as a light source of a conventional liquid crystal panel includes many sub-peaks in addition to dominant wavelengths. Consequently, color mixing occurs and results in a narrow color gamut to be reproduced. Similarly, with a spectral spectrum of a white light-emitting diode shown in FIG.

15, while the spectral spectrum does not include sub-peaks as in the case of a CCFL, the spectral spectrum spreads over a wide wavelength region. Consequently, color mixing occurs and results in a narrow color gamut to be reproduced.

In consideration thereof, in recent years, RGB LEDs are sometimes used as a backlight of a liquid crystal display. Using RGB LEDs realizes a wider color gamut as compared to using a cold cathode fluorescent lamp (CCFL). Japanese Patent Application Laid-open No. 2007-264659 proposes a technique for switching a light source of a backlight between light-emitting diodes of red, green, and blue and a white light-emitting diode depending on a display image quality mode of a display device. Japanese Patent Application Laid-open No. 2007-264659 describes that a wider color gamut to be reproduced is produced by using red, green, and blue light-emitting diodes as compared to using a white light-emitting diode as a light source of a backlight.

In addition, generally, there are methods of reducing a difference in color appearance by calibrating color reproduction of a display for viewing in a 2-degree visual field and viewing in a 10-degree visual field. Japanese Patent Application Laid-open No. 2006-253502 discloses reducing a change in color by preparing a plurality of LEDs with different peak wavelengths for each of RGB and adopting a composite spectrum as a spectrum of each color. By determining a composite spectrum of LEDs according to color matching functions of a 2-degree visual field and a 10-degree visual field, a difference in appearance due to an area effect of color can be reduced.

SUMMARY OF THE INVENTION

With the techniques described above, a difference in color matching functions due to a difference in visual angle sometimes causes color to vary depending on an observation distance and prevents accurate soft proofing from being performed.

As described in Japanese Patent Application Laid-open No. 2007-264659, a spectral spectrum of an LED has a shape that includes a steep peak wavelength in a local wavelength region such as shown in the top left diagram in FIG. 4 and in FIG. 7. Since such a steep spectral spectrum prevents color mixing among the respective colors, the use of red, green, and blue light-emitting diodes is known to expand a color gamut to be reproduced.

However, there are problems that occur as a consequence of a spectral spectrum being steep as in the case of light-emitting diodes. When color matching functions differ, a change in the stimuli represented by Expressions 1 and 2 described may increase and, as a result, a color difference ΔE may increase. Color matching functions change depending on visual angles. Therefore, even when viewing a same color chip, an apparent color differs depending on observation distance. A change in apparent color will be described based on color matching functions of a 2-degree visual field and a 10-degree visual field. FIG. 3 shows a color matching function of a 2-degree visual field and a color matching function of a 10-degree visual field. A comparison of the color matching functions reveals that sensitivities of visual cells are increased for red, green, and blue when the colors are viewed in a 10-degree visual angle as compared to viewing the colors in a 2-degree visual angle. This difference in color matching functions causes a same color to appear as different colors from a different visual angle. A difference between the color matching functions of a 2-degree visual field and a 10-degree visual field for each wavelength region is shown in FIG. 8. FIG. 8 is a graph showing values obtained by subtracting sensitivities of a 2-degree visual field from sensitivities of a 10-degree visual field. For example, with the color matching function representing sensitivities of blue, there is a significant deviation in sensitivity between the 2-degree visual field and the 10-degree visual field in a wavelength region near 440 nm. When a peak wavelength of the spectral spectrum of the blue light-emitting diode is near 440 nm, the deviation in sensitivities has a significant impact. Such a shift in color due to visual angles poses a problem when simulating a final printing finish on a display as in the case of soft proofing. Depending on a visual angle when verifying the finish, there is a possibility that accurate proofing cannot be performed.

Color matching functions do not only differ according to visual angles but may also include individual variability. Since the color matching functions of a 2-degree visual field and a 10-degree visual field as defined by the CIE represent average values of a plurality of subjects (visual sensitivity or color vision characteristics of standard colorimetric observers), a color matching function of each individual may differ from such standard color matching functions. For example, color matching functions differ depending on age or gender. When the color matching functions of a plurality of persons differ from one another, the color difference ΔE increases even when viewing color chips of the same color. An increased color difference ΔE causes color appearance to be sensed in a different way from one person to another. As described above, when using RGB LEDs as a backlight, differences in color appearance become relatively noticeable. Such a shift in color due affects accuracy when simulating a final printing finish on a display as in the case of soft proofing. Since color matching functions also include individual variability and there is a possibility that color appearance may not be consistent among persons as described above, it is difficult to effectively reduce differences in color appearance due to individual variability solely using color adjustment techniques such as that described in Japanese Patent Application Laid-open No. 2006-253502.

The present invention provides an image display device that suppresses a change in color appearance due to a difference in visual angles or to a difference in individual color matching functions.

A first aspect of the present invention is an image display device, having:

a light-emitting unit including a first light source configured such that a peak wavelength of a spectral spectrum of the light source is within a wavelength region in which a difference between color matching functions of different visual angles is small and a second light source that differs from the first light source;

a control unit configured to switch a light source to be lighted to one of the first light source and the second light source based on an instruction; and a display panel that is illuminated by the light-emitting unit.

A second aspect of the present invention is a control method for an image display device having:

a light-emitting unit including a first light source configured such that a peak wavelength of a spectral spectrum of the light source is within a wavelength region in which a difference between color matching functions of different visual angles is small and a second light source that differs from the first light source; and a display panel that is illuminated by the light-emitting unit, the control method including:

acquiring an instruction for switching between the first light source and the second light source; and controlling switching of a light source to be lighted to one of the first light source and the second light source based on the instruction.

A third aspect of the present invention is an image display device, comprising:

a light-emitting unit capable of adjusting a spectral spectrum of emitted light;

a display panel that transmits light emitted by the light-emitting unit at a transmittance in accordance with image data;

an acquiring unit configured to acquire a user's color matching function; and a control unit configured to adjust the spectral spectrum of light emitted by the light-emitting unit on the basis of a difference between the user's color matching function and a predetermined standard color matching function.

A fourth aspect of the present invention is an image display device, comprising:

a light-emitting unit capable of adjusting a spectral spectrum of emitted light;

a display panel that transmits light emitted by the light-emitting unit at a transmittance in accordance with image data;

an acquiring unit configured to acquire color matching functions of a plurality of users; and a control unit configured to calculate a variation among the color matching functions of the plurality of users for each wavelength and adjust a spectral spectrum of light emitted by the light-emitting unit so that a peak wavelength of the spectral spectrum and a wavelength at which the variation is small are consistent with one another.

A fifth aspect of the present invention is a control method for an image display device having:

a light-emitting unit capable of adjusting a spectral spectrum of emitted light and a display panel that transmits light emitted by the light-emitting unit at a transmittance in accordance with image data, the control method including:

acquiring a user's color matching function; and controlling adjusting of the spectral spectrum of light emitted by the light-emitting unit on the basis of a difference between the user's color matching function and a predetermined standard color matching function.

A sixth aspect of the present invention is a display control method for an image display device having:

a light-emitting unit capable of adjusting a spectral spectrum of emitted light and a display panel that transmits light emitted by the light-emitting unit at a transmittance in accordance with image data, the control method including:

acquiring color matching functions of a plurality of users; and controlling calculating of a variation among the color matching functions of the plurality of users for each wavelength and adjusting of a spectral spectrum of light emitted by the light-emitting unit so that a peak wavelength of the spectral spectrum and a wavelength at which the variation is small are consistent with one another.

According to the present invention, a change in color appearance due to a difference in visual angles or to a difference in individual color matching functions can be suppressed.

Further features of the present invention will become apparent from the following description of exemplary embodiments with reference to the attached drawings.

BRIEF DESCRIPTION OF THE DRAWINGS

FIGS. 10A to 10D are block diagrams showing a configuration of a backlight according to the embodiment;

DESCRIPTION OF THE EMBODIMENTS

Hereinafter, embodiments of an image display device and a control method thereof according to the present invention will be described.

(First Embodiment)

Figure 1:
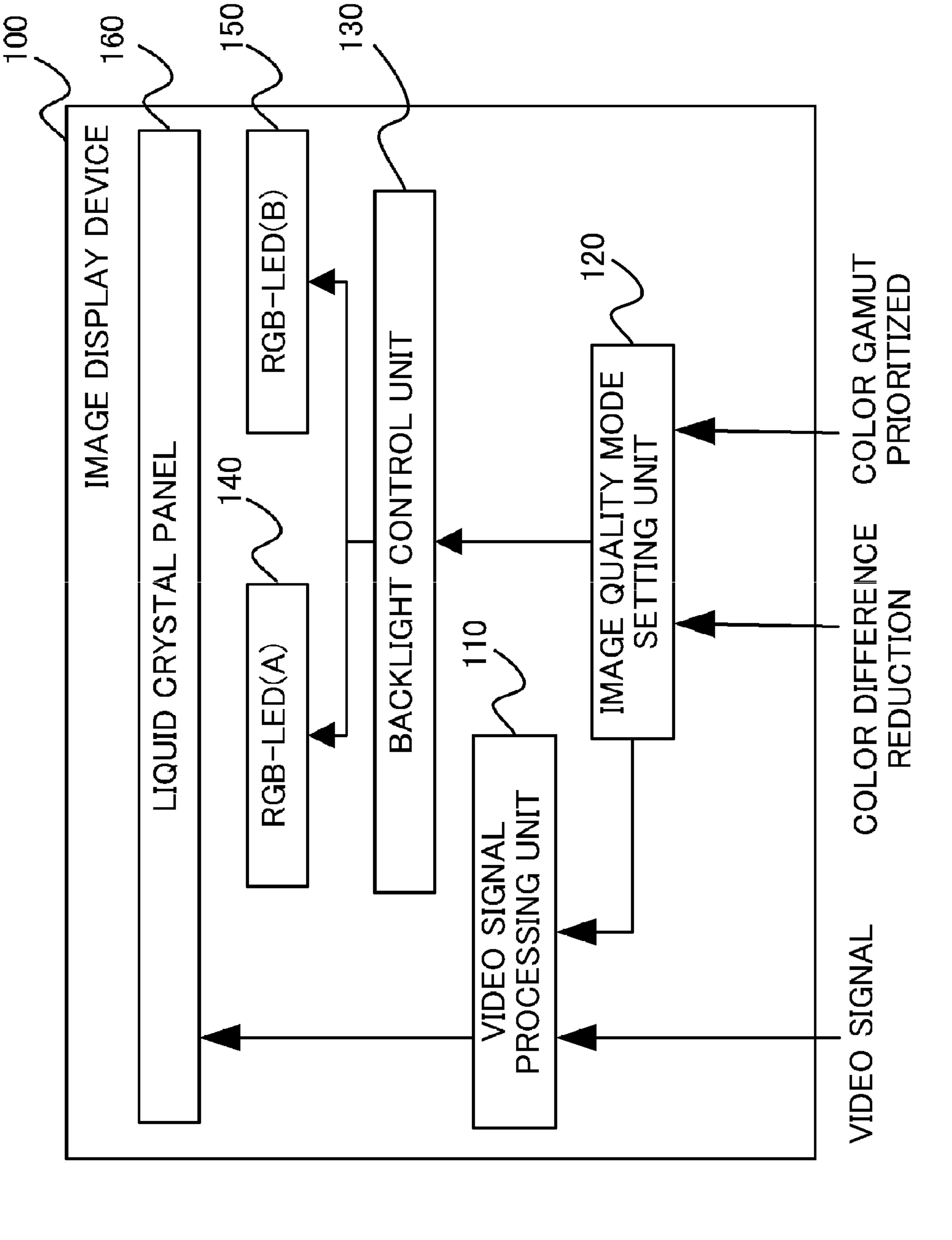
FIG. 1 is a block diagram showing a configuration of an image display device 100 according to an embodiment.

With the image display device according to a first embodiment, switching can be performed between a plurality of image quality modes. The first embodiment has two image quality modes. One image quality mode (display mode) is a color difference reduction mode (a first display mode) which suppresses a change (fluctuation) in color due to visual angles and which is favorable when accurate color reproduction is required as in the case of soft proofing. Another image quality mode (display mode) is a wide color gamut mode (a second display mode) which widens a color gamut to be reproduced and which is favorable when emphasizing color reproducibility as in the case of viewing photographs. In addition, switching is performed between light-emitting diodes to be lighted depending on image quality modes. A backlight of an image display device 100 shown in FIG. 1 is a device that illuminates a liquid crystal panel 160. The backlight has two light sources including a first light source that is lighted in the color difference reduction mode and a second light source that is lighted in the wide color gamut mode. Each light source is constituted by three light-emitting elements (a red light-emitting element, a green light-emitting element, and a blue light-emitting element). In other words, the entire backlight is constituted by a total of six light-emitting elements. The second light source that is lighted in the wide color gamut mode is red, green, and blue light-emitting diodes (RGB-LED (A)) 140, and the first light source that is lighted in the color difference reduction mode is red, green, and blue light-emitting diodes (RGB-LED (B)) 150. In particular, the light-emitting diodes that are lighted in the color difference reduction mode are a light source in which peak wavelengths of spectral spectra of the red, green, and blue light-emitting diodes are consistent with a wavelength region with a small difference in spectral spectrum between color matching functions of a 2-degree visual field and a 10-degree visual field.

Hereinafter, the first embodiment will be described with reference to the drawings. FIG. 1 shows an example of a configuration of the image display device 100 to which the present invention is applied. The configuration of this example includes the image display device 100, a video signal processing unit 110, an image quality mode setting unit 120, a backlight control unit 130, the RGB-LED (A) 140, and the RGB-LED (B) 150. The image display device 100 is assumed to be an image display device which has a calibration function and which enables adjustment of display colors such as a color management display and a master display.

(Image Quality Mode Setting Unit 120)

The image quality mode setting unit 120 is a processing block which selects and sets, in response to an instruction, any of an image quality mode that prioritizes a wide color gamut (the wide color gamut mode) and an image quality mode that prioritizes reduction of a color difference due to a difference in visual angles (a color difference reduction mode). Switching of image quality mode settings may be performed by providing the image display device 100 with an image quality mode setting button and operating the image quality mode setting button. Alternatively, switching may be performed by operating an application of a personal computer connected to the image display device or by operating an on screen display (OSD) of the image display device 100. When an image quality mode is set by a user, the image quality mode setting unit 120 notifies the image quality mode to the video signal processing unit 110 and the backlight control unit 130.

(Video Signal Processing Unit 110)

The video signal processing unit 110 performs signal processing such as gamma correction, color temperature correction, color gamut correction, and unevenness correction on an RGB video signal inputted to the image display device 100 and outputs the video signal to the liquid crystal panel 160. Processing performed by the video signal processing unit 110 is necessary for calibration to reproduce accurate color by the image display device 100. With gamma correction, display characteristics of the liquid crystal panel 160 are corrected so that display characteristics of the image display device 100 equals gamma 2.2. With color temperature correction, a ratio of RGB signal gains is adjusted so that a correction is made to a specified color temperature (for example, 5000 K). With color gamut correction, RGB signal gains are adjusted so that the color gamut becomes consistent with a standard color gamut of sRGB, AdobeRGB, or the like. Color gamut correction involves calibrating the color gamut so as to become consistent with a standard color gamut by correcting RGB signal gains using a 3D lookup table (3D-LUT) constituted by three-dimensional RGB lattice points. In the first embodiment, as standard color gamuts, adjustments are made to AdobeRGB in the wide color gamut mode and to sRGB in the color difference reduction mode. With unevenness correction, display unevenness of the liquid crystal panel 160 or the backlight is corrected so that color or brightness of a screen becomes even. The video signal processing unit 110 performs the signal processing described above and outputs a video signal to the liquid crystal panel 160.

(Liquid Crystal Panel 160)

The liquid crystal panel 160 is a display panel capable of varying transmittance of light for each pixel depending on voltage. The liquid crystal panel 160 is provided with an RGB color filter and controls the transmittance of light emitted by the backlight per RGB to reproduce color based on the video signal.

(Backlight Control Unit 130)

The backlight control unit 130 is a processing block that controls the light-emitting diodes that are the light source of the image display device 100. The backlight control unit 130 adjusts brightness of the image display device 100 by adjusting a current that is supplied to the light-emitting diodes. Since it is difficult to control emission intensity of the light-emitting diodes by current alone, the backlight control unit 130 adjusts brightness by supplying a constant current amount to the light-emitting diodes and performing pulse width modulation (PWM) control. PWM control refers to a modulating method involving controlling a light-emitting ratio (duty ratio) per unit time.

(RGB-LED)

The six light-emitting diodes that are controlled by the backlight control unit 130 will now be described.

Figure 6:
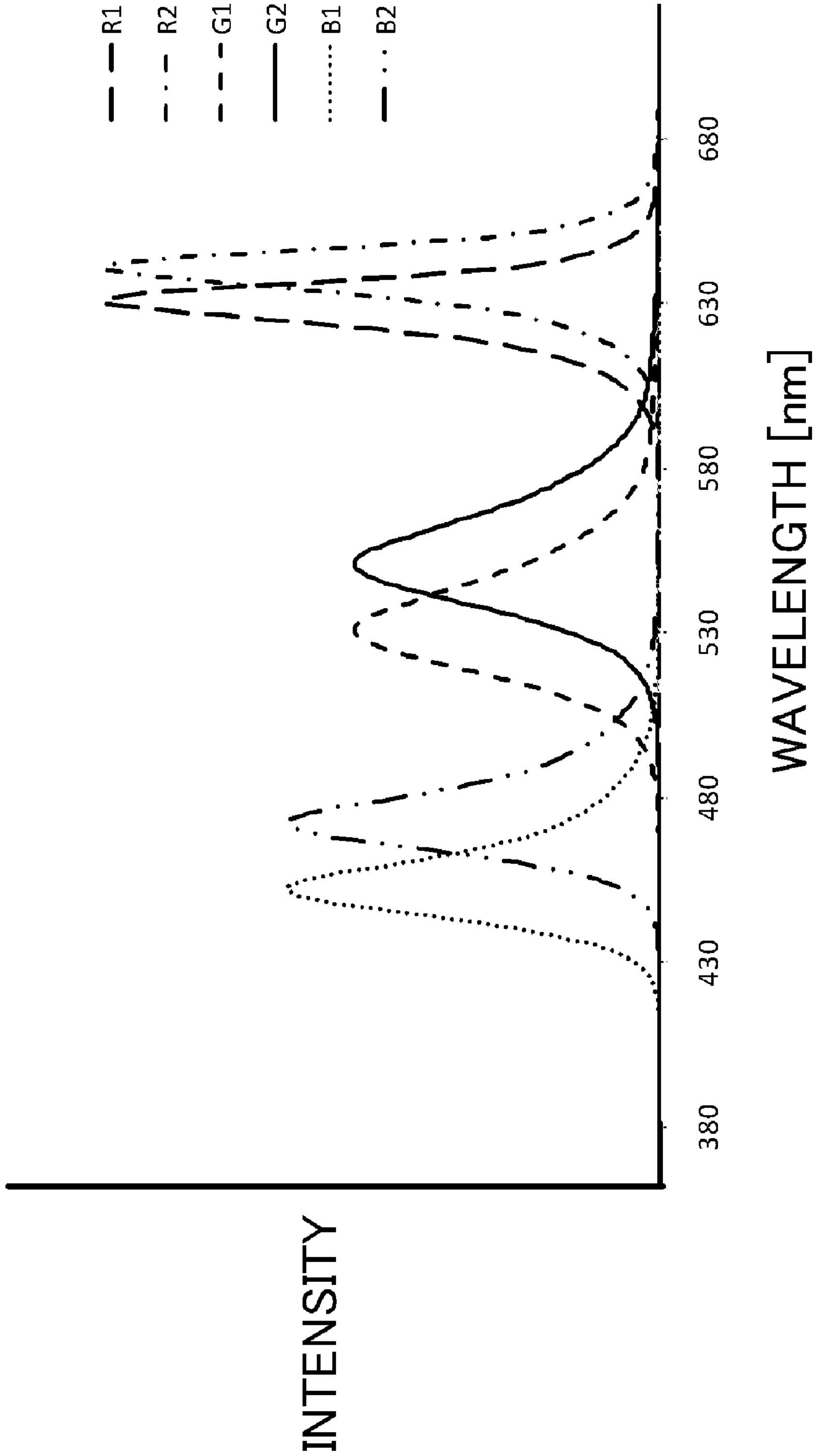
FIG. 6 is a diagram showing a spectral spectrum of a light-emitting diode according to the embodiment.

Red, green, and blue light-emitting diodes that are lighted in the wide color gamut mode are assumed to be an RGB-LED (A) 140, and red, green, and blue light-emitting diodes that are lighted in the color difference reduction mode are assumed to be an RGB-LED (B) 150. The RGB-LED (A) 140 and the RGB-LED (B) 150 are light-emitting diodes with spectral spectra that differ from one another. Spectral spectra of light-emitting diodes R1, G1, and B1 included in the RGB-LED (A) 140 and light-emitting diodes R2, G2, and B2 included in the RGB-LED (B) 150 are shown in FIG. 6.

Figure 5:
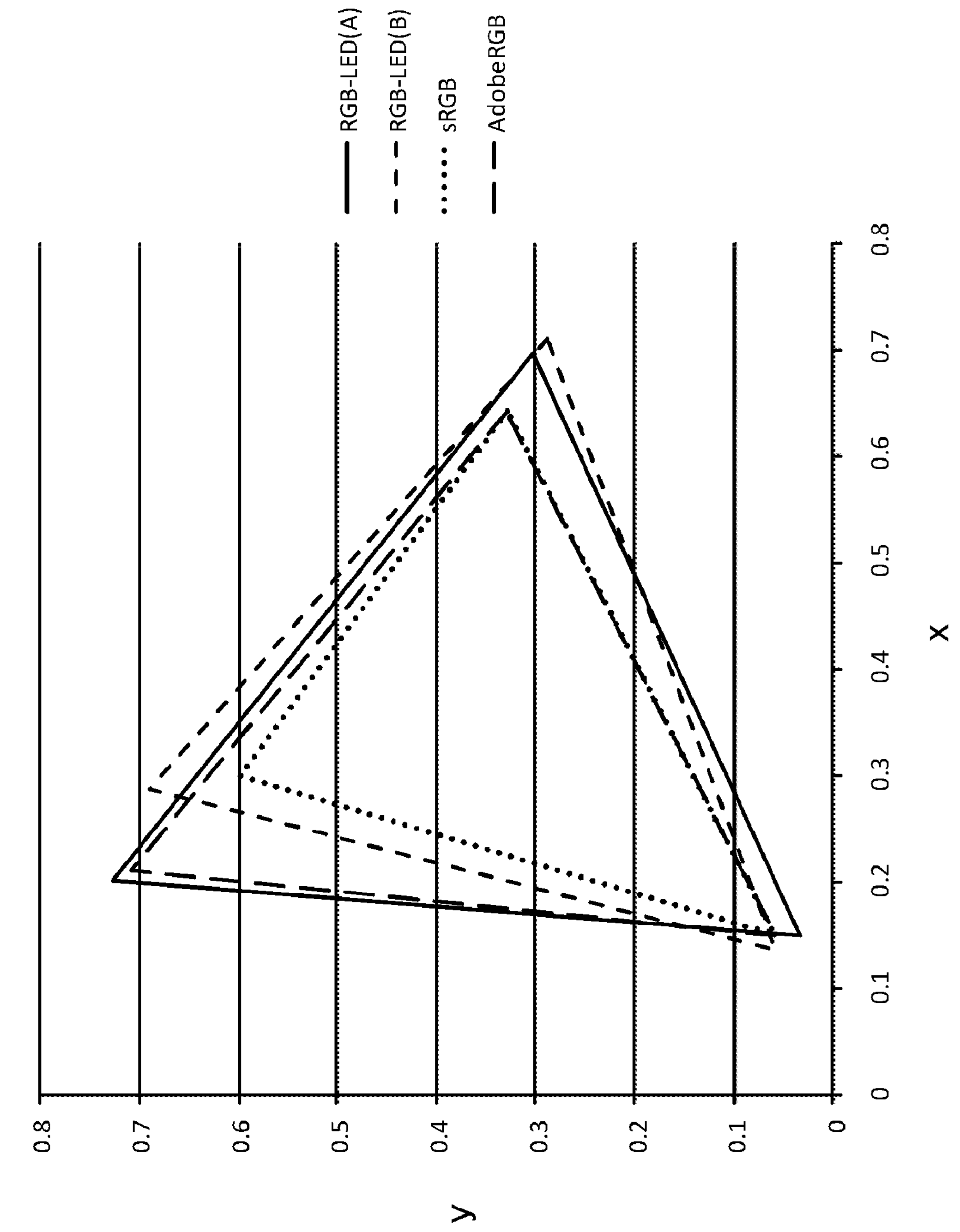
FIG. 5 is a diagram showing color gamut to be reproduced in a wide color gamut mode and a color difference reduction mode according to the embodiment.

The RGB-LED (A) 140 represents a light-emitting diode group with a wide color gamut to be reproduced. A solid line in FIG. 5 depicts a color gamut to be reproduced of the image display device 100 when light is emitted from the RGB-LED (A) 140.

On the other hand, the RGB-LED (B) 150 represents a light-emitting diode group with a small difference in apparent color due to different visual angles. As described earlier, a spectral spectrum of a color matching function differs depending on the visual angle. In other words, even if the spectral spectrum of the image display device 100 is the same, a color that is perceived by a person differs depending on the visual angle.

Figure 7:
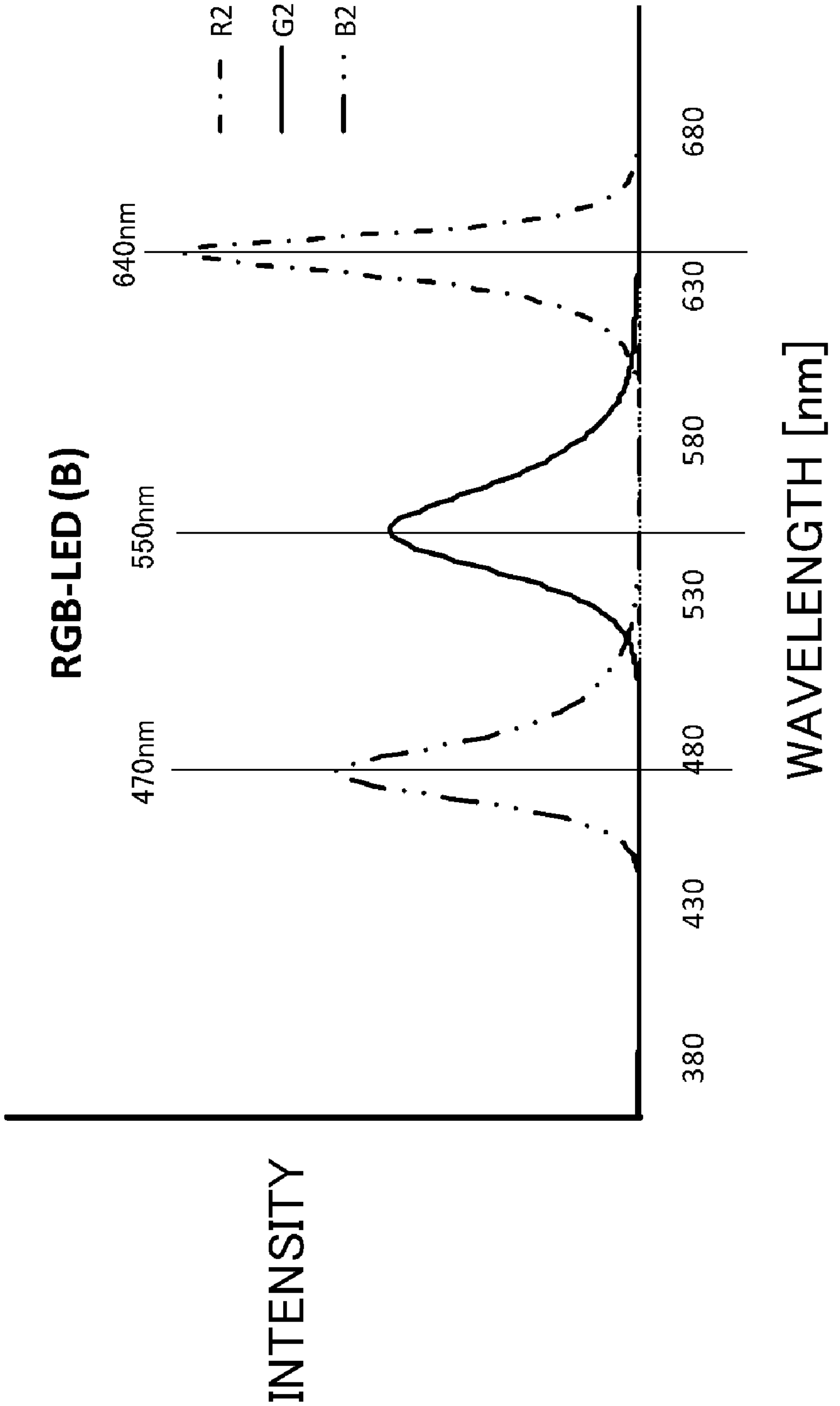
FIG. 7 shows a spectral spectrum of a light-emitting diode that is lighted in the color difference reduction mode.

In consideration thereof, the present invention is configured so that a peak wavelength of the spectral spectrum of the RGB-LED (B) 150 is consistent with a wavelength region in which a difference in spectral spectra of color matching functions between a 2-degree visual field and a 10-degree visual field is small. According to FIG. 8 which shows a difference in color matching functions between a 2-degree visual field and a 10-degree visual field for each wavelength region, wavelength regions with a small difference in spectral sensitivity is near 470 nm for blue, near 550 nm for green, and 640 nm for red. FIG. 7 shows spectral spectra of light-emitting diodes when such wavelength regions are consistent with peak wavelengths of blue, green, and red light-emitting diodes. In addition, the color gamut to be reproduced of the image display device 100 when light is emitted from the RGB-LED (B) 150 is depicted by a fine dashed line in FIG. 5.

<Processing Operation Flow>

Figure 2:
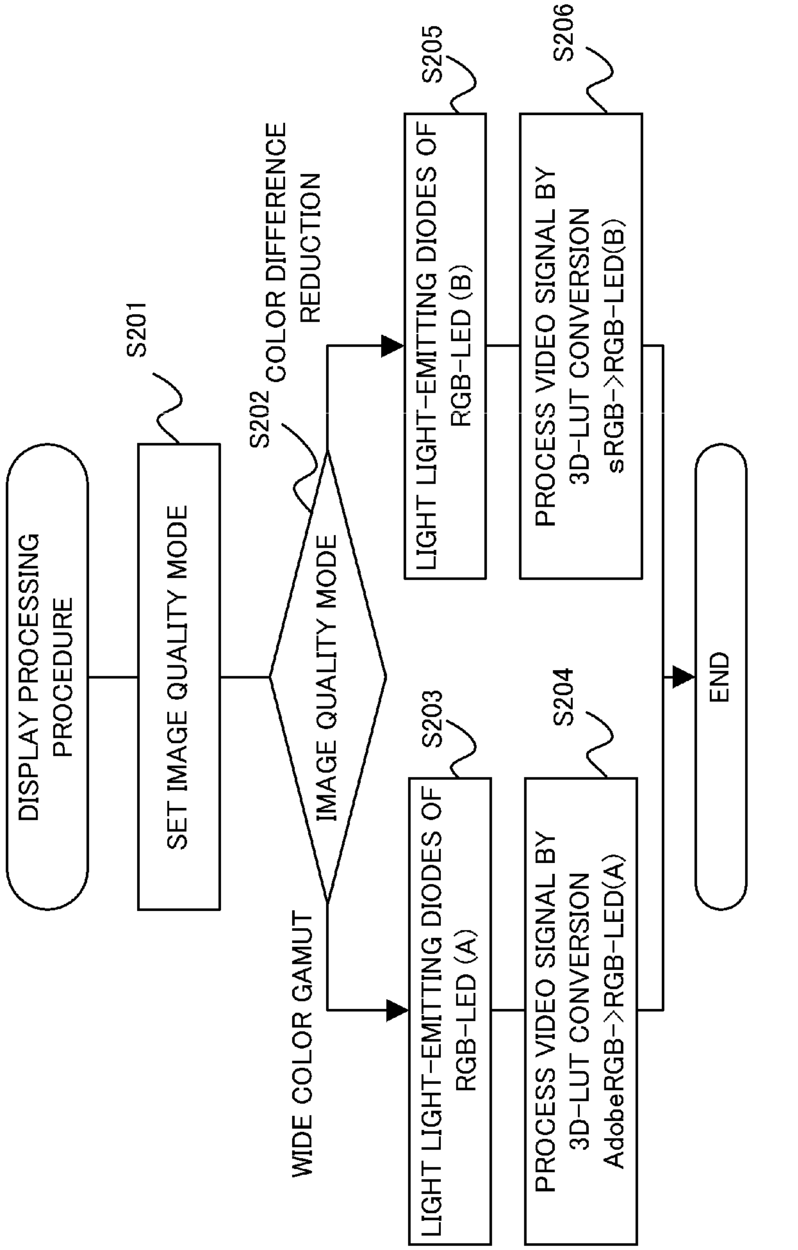
FIG. 2 is a diagram showing a processing flow according to the embodiment.

Next, a processing operation flow for switching between light-emitting diode groups to be lighted depending on the image quality mode by the image display device 100 will be described with reference to FIG. 2.

(S201)

First, the user sets an image quality mode. The color difference reduction mode is set when color reproduction with greater accuracy is required as in the case of soft proofing, and the wide color gamut mode is set when prioritizing color reproducibility as in the case of viewing or exhibiting photographs. An image quality mode can be set from, for example, an on-screen display (OSD) menu of the image display device 100. The image quality mode set by the user is notified from the image quality mode setting unit 120 to the video signal processing unit 110 and the backlight control unit 130.

(S202)

Next, based on the image quality mode set in S201, the backlight control unit 130 switches control methods of the backlight. When the image quality mode set by the user is the color difference reduction mode, the operation flow proceeds to S203, and when the image quality mode set by the user is the wide color gamut mode, the operation flow proceeds to S204.

(S203)

When the image quality mode is the wide color gamut mode, the backlight control unit 130 lights the light-emitting diodes of the RGB-LED (A) 140 as shown in FIG. 10A. In other words, the light-emitting diodes of R1, G1, and B1 are lighted and the light-emitting diodes of R2, G2, and B2 are turned off. FIG. 10C shows a backlight structure 1010 in a state where the RGB-LED (A) 140 is lighted.

(S204)

Furthermore, the video signal processing unit 110 performs adjustment so that the color gamut of the image display device 100 is AdobeRGB when the RGB-LED (A) 140 is lighted. As shown in FIG. 5, the video signal processing unit 110 adjusts the RGB signal gains using an RGB 3D-LUT so as to convert the color gamut when the RGB-LED (A) 140 is lighted into AdobeRGB. Due to this adjustment, the RGB signal inputted to the image display device 100 corresponds to an RGB signal of AdobeRGB.

(S205)

On the other hand, when the image quality mode is the color difference reduction mode, the backlight control unit 130 lights the light-emitting diodes of the RGB-LED (B) 150. In other words, as shown in FIG. 10B, the light-emitting diodes of R1, G1, and B1 are turned off and the light-emitting diodes of R2, G2, and B2 are lighted. FIG. 10D shows a backlight structure 1020 in a state where the RGB-LED (B) 150 is lighted. Spectral data of the image display device 100 at this point is shown in FIG. 7.

Figure 8:
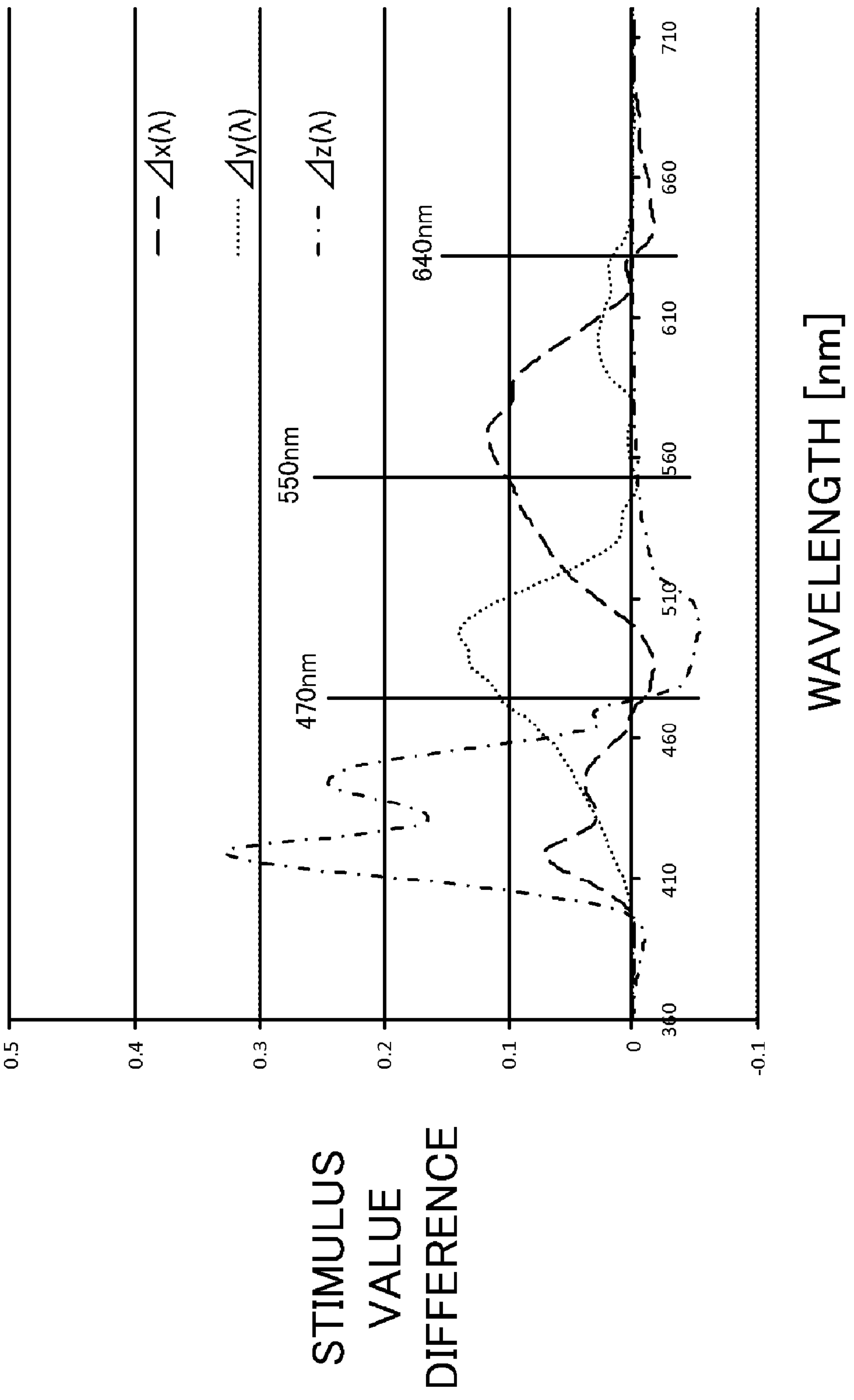
FIG. 8 is a diagram showing differences between a 2-degree visual field and a 10-degree visual field.
Figure 9:
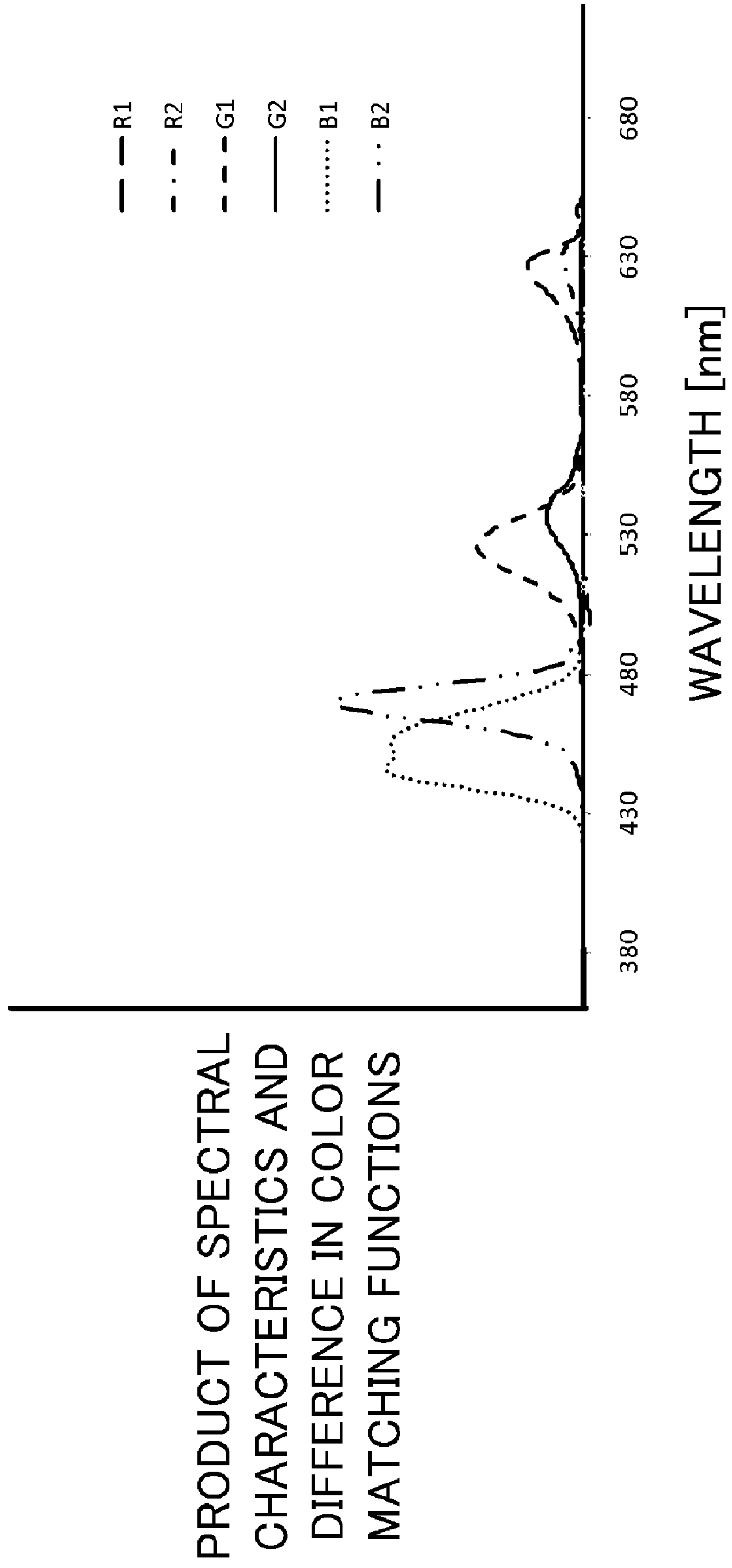
FIG. 9 is a diagram showing differences between a 2-degree visual field and a 10-degree visual field of respective light-emitting diodes according to the embodiment.

Products of respective spectral spectra of R1, G1, B1, R2, G2, and B2 (FIG. 6) and a difference in color matching functions between a 2-degree visual field and a 10-degree visual field (FIG. 8) are shown in FIG. 9. The greater an integration value of the product, the greater the difference between a color as viewed in a 2-degree visual field and the color as viewed in a 10-degree visual field. FIG. 9 reveals that, compared to R1, G1, and B1 in the wide color gamut mode, integration values of R2, G2, and B2 in the color difference reduction mode are smaller.

(S206)

Furthermore, the video signal processing unit 110 performs adjustment so that the color gamut of the image display device 100 is sRGB when the RGB-LED (B) 150 is lighted. As shown in FIG. 5, the video signal processing unit 110 adjusts the RGB signal gains using an RGB 3D-LUT so as to convert the color gamut when the RGB-LED (B) 150 is lighted into sRGB. Due to this adjustment, the RGB signal inputted to the image display device 100 corresponds to an RGB signal of sRGB. As described above, by switching light-emitting diodes that are lighted in the backlight, an sRGB image can be handled in a state where a color difference due to visual angles is reduced.

In the first embodiment, since a phenomenon where appearances of color differ due to visual angles which is particularly noticeable in display devices with a wide color gamut such as red, green and blue light-emitting diodes can be reduced and more stable color can be displayed, verification can be performed with greater accuracy in soft proofing and the like.

In addition, while light-emitting diodes are used as the backlight of the liquid crystal panel 160 in the first embodiment, a laser light source with a narrow half-value width may be used instead.

(Second Embodiment)

A second embodiment represents an embodiment in which a color distribution of an image displayed on the image display device 100 is analyzed and switching of light-emitting diodes to be lighted is performed. A configuration of the second embodiment differs from that of the first embodiment in a color information analyzing unit 1110 and a backlight control system determining unit 1120 (refer to FIG. 11).

(Color Information Analyzing Unit 1110)

Figure 11:
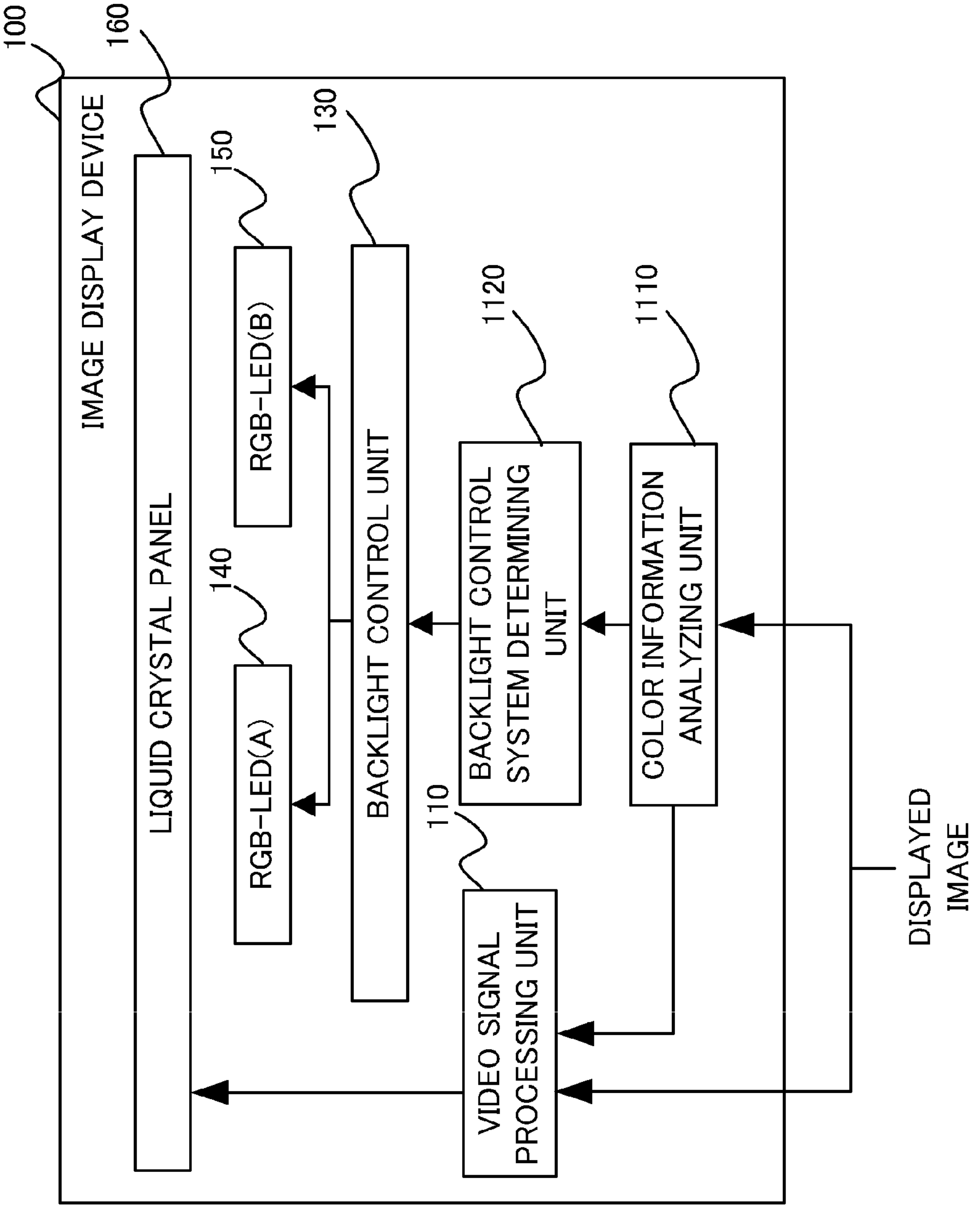
FIG. 11 is a block diagram showing a configuration of an image display device 100 according to a second embodiment.

In FIG. 11, the color information analyzing unit 1110 is a processing block that analyzes a color distribution of an image to be displayed on the image display device 100. Examples of image formats include joint photographic experts group (JPEG) and tagged image file format (TIFF). The color information analyzing unit 1110 acquires information indicating which color space an RGB value of an image belongs to from a color space tag of exchangeable image file format (EXIF) information of the image. Next, based on the color space of the image, the color information analyzing unit 1110 converts an RGB value of each pixel into an XYZ value. Alternatively, the color information analyzing unit 1110 may acquire an XYZ value from a color space definition of an international color consortium (ICC) profile embedded in the image. As an example, Expression 4 represents a conversion formula from an RGB value to an XYZ value when the color space of an image is AdobeRGB.

[Expression 4]

$$\begin{bmatrix} X \\ Y \\ Z \end{bmatrix} = \begin{bmatrix} 0.5778, & 0.1825, & 0.1902 \\ 0.3070, & 0.6170, & 0.0761 \\ 0.0181, & 0.0695, & 1.0015 \end{bmatrix} \begin{bmatrix} R \\ G \\ B \end{bmatrix} \quad \text{(Expression 4)}$$

Figure 13:
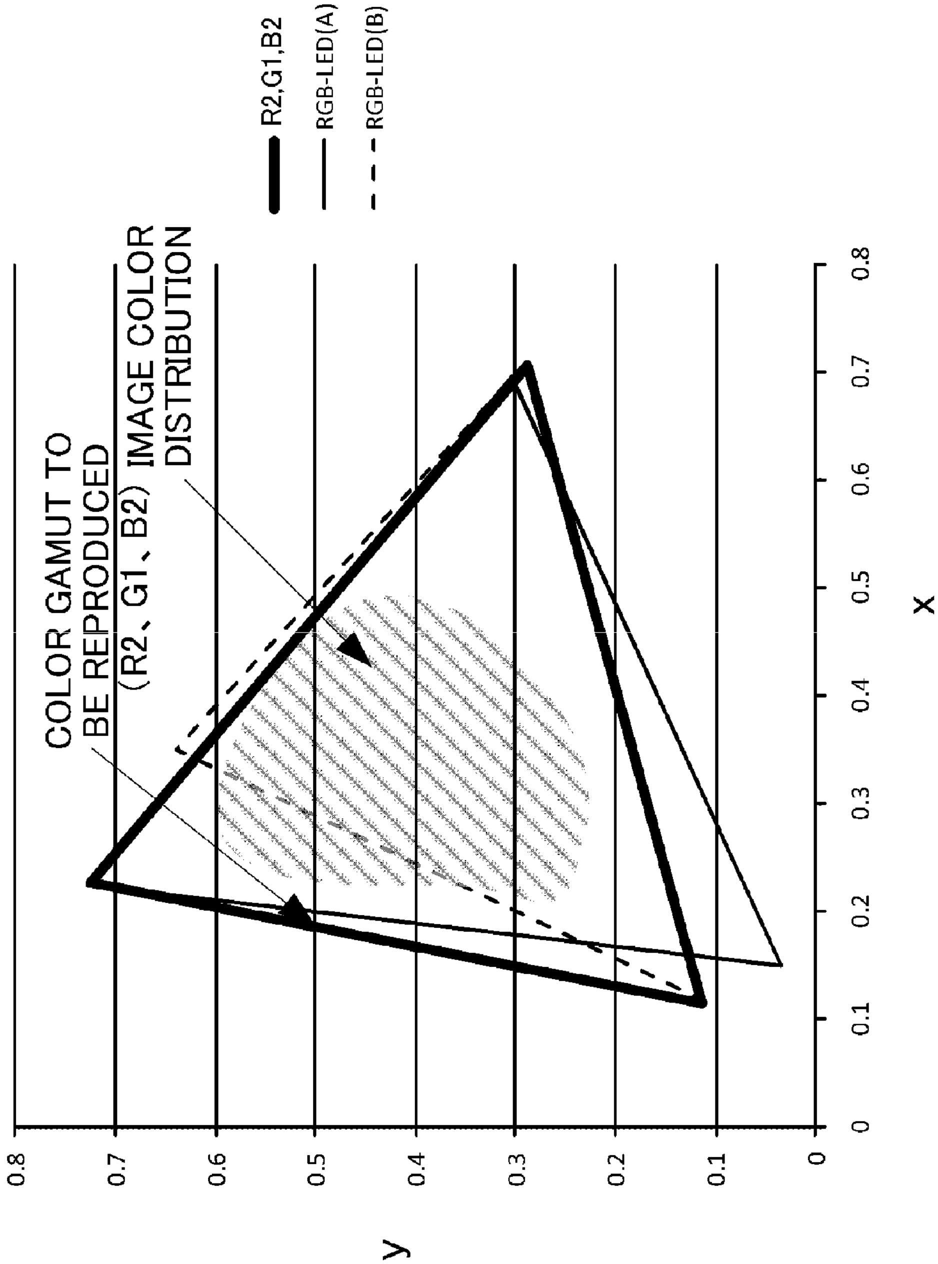
FIG. 13 is a diagram showing a color gamut to be reproduced according to the second embodiment.
Figure 14:
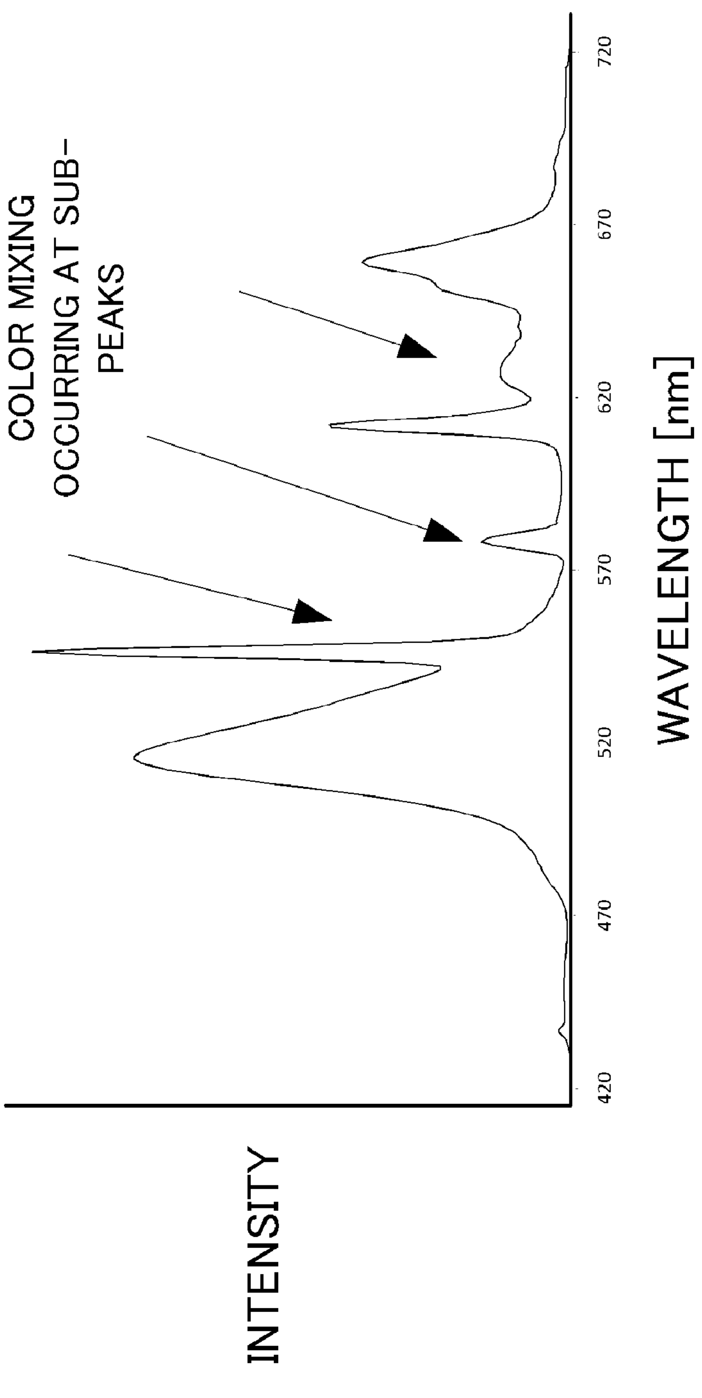
Fig.14 PRIOR ART
FIG. 14 is a diagram showing a spectral spectrum of a CCFL.
Figure 15:
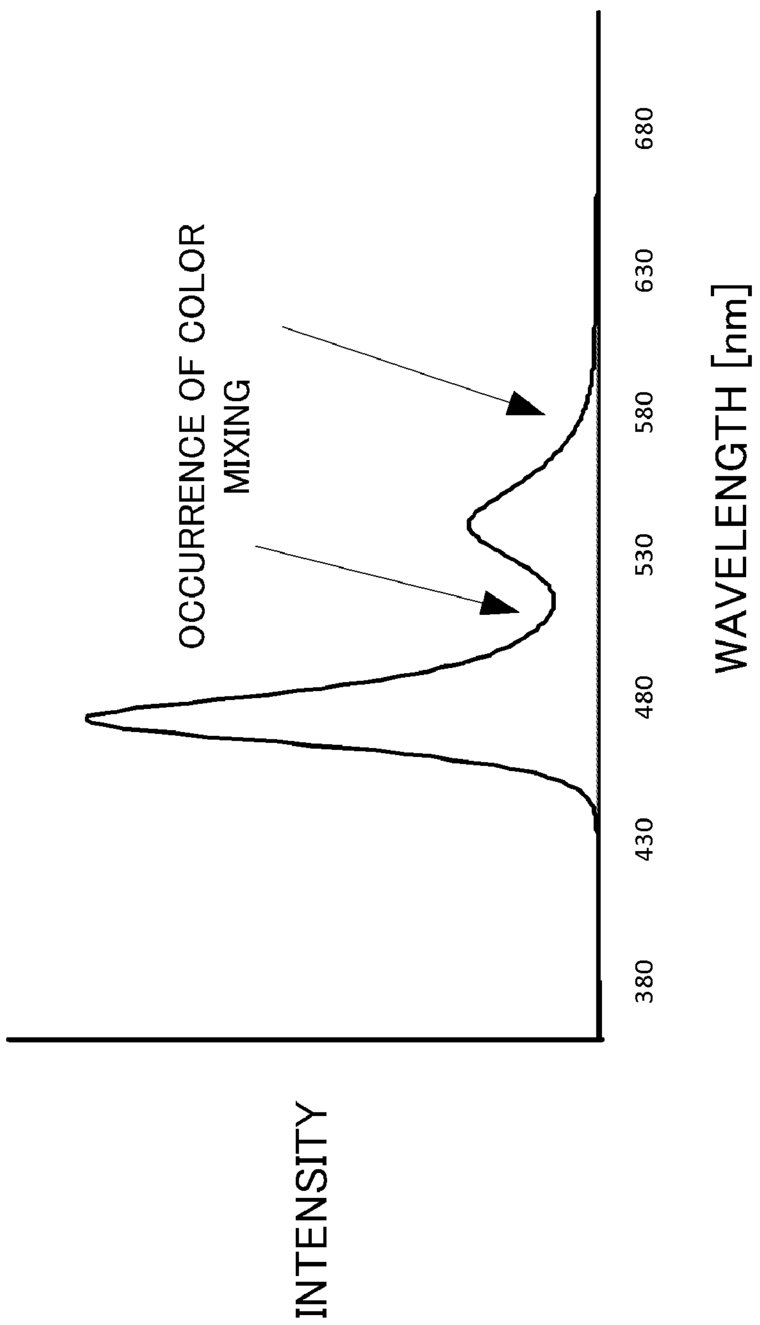
Fig.15 PRIOR ART
FIG. 15 is a diagram showing a spectral spectrum of a white light-emitting diode.

FIG. 13 shows an example in which XYZ values calculated by the color information analyzing unit 1110 are converted into an xyY display system and plotted on an xy chromaticity diagram. A shaded portion in FIG. 13 represents a color distribution of the image.

(Backlight Control System Determining Unit 1120)

The backlight control system determining unit 1120 is a processing block that determines which light-emitting diode is to be lighted or turned off based on color analysis information of the color information analyzing unit 1110. In a similar manner to the first embodiment, the light-emitting diodes that are control objects are R1, G1, B1, R2, G2, and B2.

<Processing Operation Flow>

Figure 12:
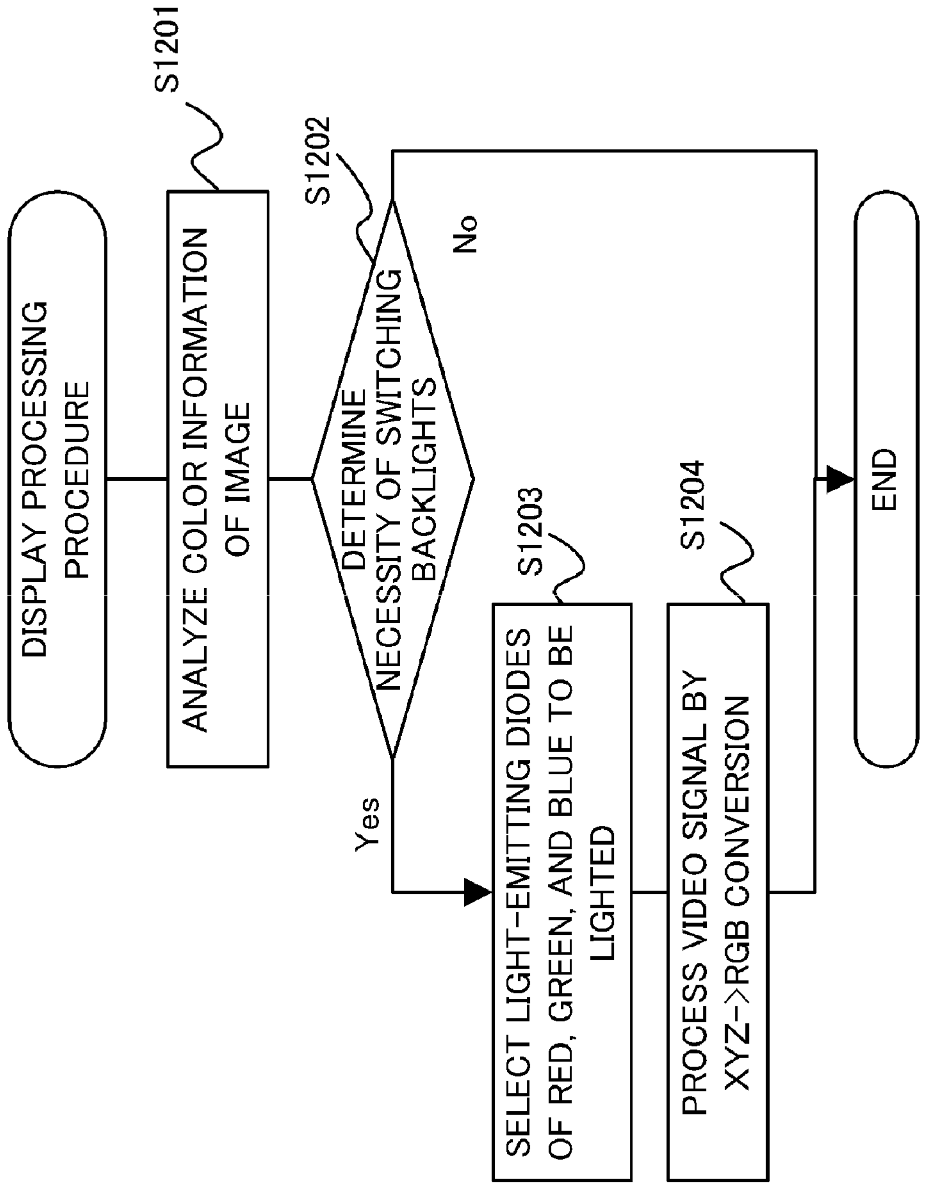
FIG. 12 is a diagram showing a processing flow according to the second embodiment.

A processing operation flow of the second embodiment will now be described with reference to FIG. 12.

(S1201)

First, the color information analyzing unit 1110 analyzes a color distribution of an image to be displayed on the image display device 100. Specifically, the color information analyzing unit 1110 calculates XYZ values from color space information and RGB values of the image and outputs the XYZ values as a color distribution analysis result to the video signal processing unit 110 and the backlight control system determining unit 1120.

(S1202)

Based on the color distribution analysis result of the color information analyzing unit 1110, the backlight control system determining unit 1120 calculates a color gamut to be reproduced that includes the color distribution of the image and determines whether or not switching of light-emitting diodes to be lighted must be performed in order to perform display in the color gamut to be reproduced. At this point, the backlight control system determining unit 1120 preferentially lights the R2, G2, and B2 light-emitting diodes so as to reduce a difference in color due to visual angles. A case where the color distribution of the image is as shown in FIG. 13 will be described as an example. First, the backlight control system determining unit 1120 determines whether or not switching of light-emitting diodes of the backlight must be performed when displaying the image. Assuming that the RGB-LED (B) 150 is currently being lighted, since the color distribution of the image exceeds a color gamut of the RGB-LED (B) 150, there are colors that cannot be reproduced. Therefore, the backlight control system determining unit 1120 determines whether or not the color distribution of the image is included in a color gamut to be reproduced that is created by lighting a light-emitting diode of at least one color that is designed for a wide color gamut among the light-emitting diodes of three colors and lighting light-emitting diodes designed for color difference reduction for the remaining colors. In the illustrated example, a determination is made to light the R2, G1, and B2 light-emitting diodes and turn off the R1, G2, and B1 light-emitting diodes to create a color gamut to be reproduced that includes the color distribution of the image. Since selecting G2 as the green light-emitting diode prevents the color of the image in the specified color space from being reproduced, G1 is selected as the green light-emitting diode. As described earlier, since R2 and B2 are less affected by a color difference due to visual angles, the effect of a color difference due to visual angles can be reduced as compared to lighting R1, G1, and B1.

(S1203)

The backlight control unit 130 lights light-emitting diodes according to the determination result of the backlight control system determining unit 1120. In the example described above, the R2, G1, and B2 light-emitting diodes are lighted. By switching lighting of green light-emitting diodes, a color gamut to be reproduced that includes the color distribution of the image can be created.

(S1204)

Finally, the video signal processing unit 110 converts image data converted into XYZ values into RGB values of a color gamut to be reproduced corresponding to the lighted light-emitting diodes. In the example described above, image data converted into XYZ values is converted into RGB values of a color gamut to be reproduced that is created when lighting the R2, G1, and B2 light-emitting diodes. In other words, in the second embodiment, RGB values on an AdobeRGB color space are converted into XYZ values on a device-independent color space and then converted into RGB values of a color gamut to be reproduced that is created when lighting the R2, G1, and B2 light-emitting diodes. After converting the XYZ values into RGB values in this manner, the video signal processing unit 110 performs signal processing such as gamma correction, color temperature correction, and unevenness correction and outputs a video to the liquid crystal panel 160.

In the second embodiment, a color distribution of an image to be displayed on the image display device 100 is analyzed and, according to an analysis result, lighting of light-emitting diodes is controlled so that as many as possible of the light-emitting diodes constituting the first light source for the color difference reduction mode are lighted within a range that includes the color distribution of the image. Accordingly, a difference in apparent color due to visual angles can be reduced while maintaining a wide color gamut as much as possible. In addition, the user is no longer required to switch image quality modes as in the first embodiment, and switching of backlight lighting systems can be automatically performed depending on the intended use such as when prioritizing a wide color gamut or when desiring to reduce color difference.

(Third Embodiment)

A third embodiment represents an embodiment in which a user having a color matching function that differs from a standard color matching function adjusts a spectral spectrum so that appearance of color becomes consistent with that of an average user when viewing a monitor by himself/herself. In order to suppress a change in color due to such individual variability, the user's color matching function is obtained and a spectral spectrum of an image display device 1600 is adjusted based on a difference between the user's color matching function and a standard color matching function. The user's color matching function is obtained by acquiring a color matching function conforming to the user from a database based on information regarding age and visual distance that is inputted by the user.

(Processing Blocks)

Figure 16:
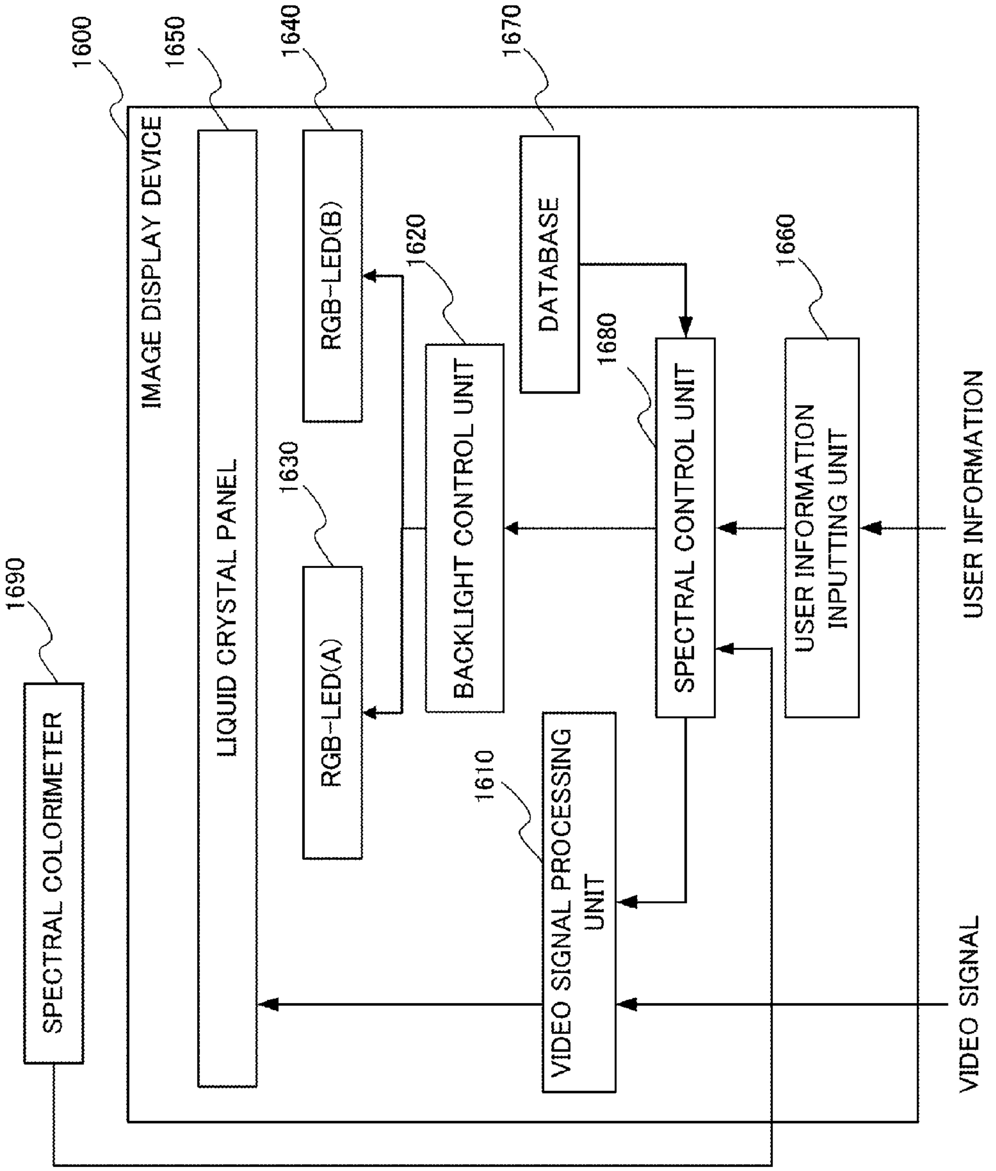
FIG. 16 is a block diagram showing a configuration of an image display device according to third and fourth embodiments.

Hereinafter, the third embodiment will be described with reference to the drawings. FIG. 16 shows an example of a configuration of the image display device 1600 according to the third embodiment. The image display device 1600 is constituted by a video signal processing unit 1610, a backlight control unit 1620, an RGB-LED (A) 1630, an RGB-LED (B) 1640, a liquid crystal panel 1650, a user information inputting unit 1660, a database 1670, a spectral control unit 1680, and a spectral colorimeter 1690. The image display device 1600 is assumed to be a device which has a calibration function and which enables adjustment of display colors such as a color management display and a master display.

The video signal processing unit 1610, the backlight control unit 1620, the user information inputting unit 1660, the database 1670, and the spectral control unit 1680 may be realized by hardware circuits or by a processor (MPU, FPGA, DSP, or the like) and software. Alternatively, these processing blocks may be realized in combination.

(Video Signal Processing Unit 1610)

The video signal processing unit 1610 performs signal processing on an RGB video signal inputted to the image display device 1600 and outputs a video to the liquid crystal panel 1650. Examples of the performed signal processing include gamma correction, color temperature correction, color gamut correction, and unevenness correction. Such signal processing is desirably performed for calibration to reproduce accurate color by the image display device 1600. For example, with gamma correction, display characteristics of the liquid crystal panel 1650 is corrected by adjusting RGB signal gains using a 1D-LUT so that display characteristics of the image display device 1600 equals gamma 2.2. With color temperature correction, a ratio of RGB signal gains is adjusted so that a correction is made to a specified color temperature (5000K). With color gamut correction, RGB signal gains are adjusted so that the color gamut becomes consistent with a standard color gamut of sRGB, AdobeRGB, or the like. An adjustment method thereof involves calibrating the color gamut to become consistent with a standard color gamut by correcting RGB signal gains using a 3D-LUT constituted by three-dimensional RGB lattice points. With unevenness correction, display unevenness of the liquid crystal panel 1650 or the backlight is corrected so that color or brightness of a screen becomes even. After performing the signal processing described above, the video signal processing unit 1610 outputs a video to the liquid crystal panel 1650.

(Backlight Control Unit 1620)

The backlight control unit 1620 is a processing block that controls the LEDs constituting the backlight of the image display device 1600 and adjusts brightness of the image display device 1600 by adjusting a current that is supplied to the LEDs. However, since it is difficult to control emission intensity of the LEDs by current alone, the backlight control unit 1620 adjusts brightness by supplying a constant current amount to the LEDs and further controlling a PWM output value. A PWM output value refers to a value representing a light-emitting ratio (duty ratio) per unit time. The backlight control unit 1620 generates a pulse signal that lights or turns off the LED at a constant period determined based on the PWM output value and outputs the pulse signal to each LED. Such control enables fine adjustment of the emission intensity of the LEDs.

(RGB-LED)

Figure 18A:
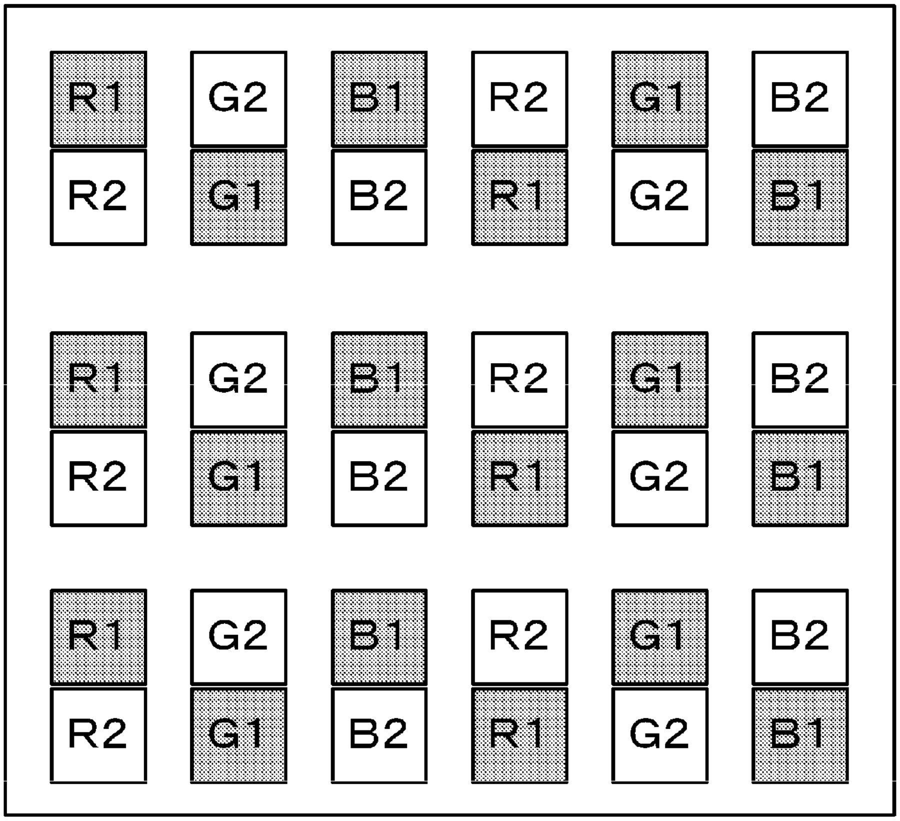
FIGS. 18A and 18B are diagrams showing a configuration of a backlight according to the third embodiment.
Figure 18B:
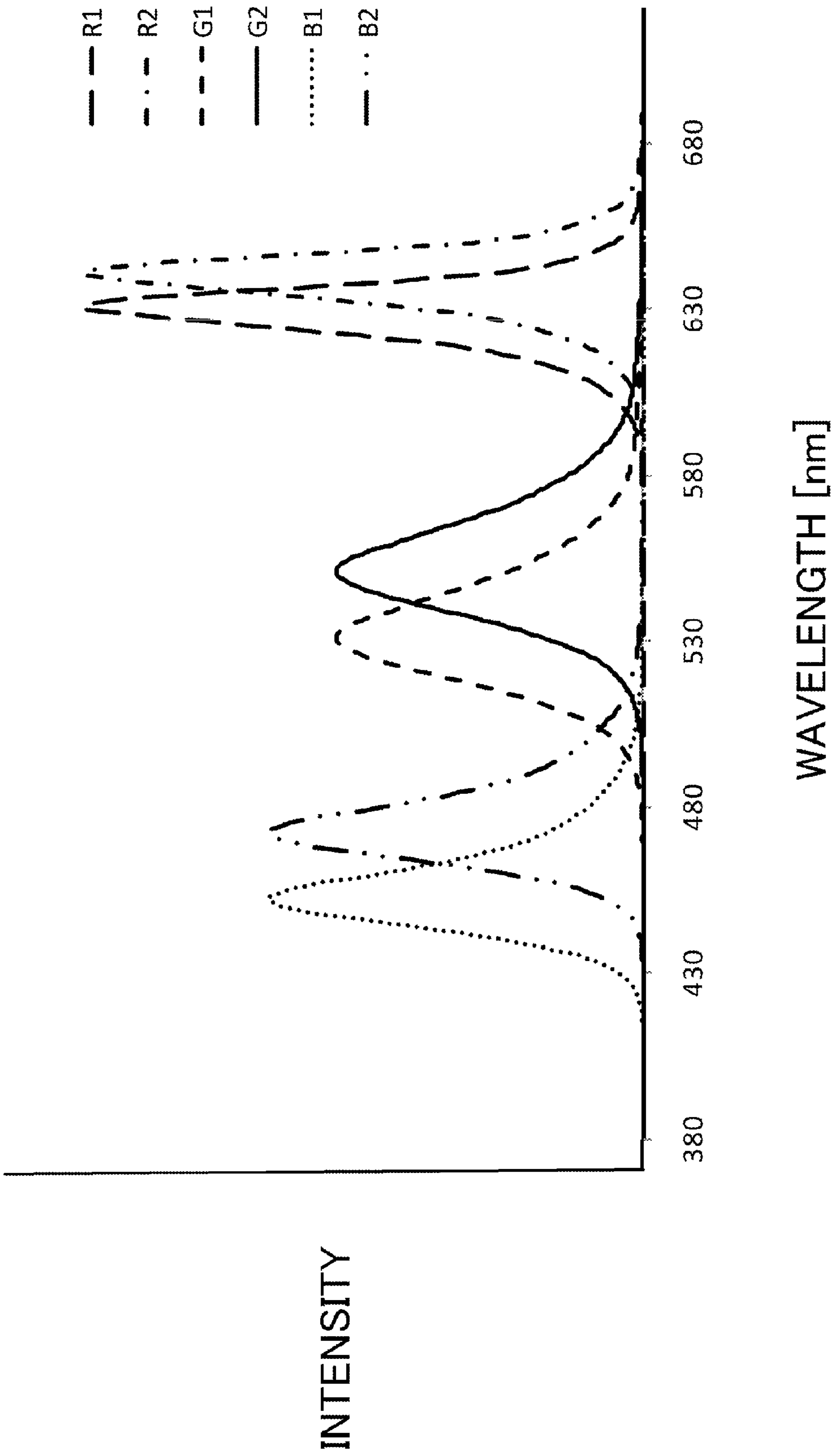

Next, the LEDs controlled by the backlight control unit 1620 will be described. The backlight of the image display device 1600 is constituted by a total of six LEDs including 2 LEDs for each of red, green, and blue. A configuration example of the LEDs is shown in FIG. 18A. As shown, the backlight includes R1 and R2 for red, G1 and G2 for green, and B1 and B2 for blue. Moreover, the arrangement method shown in FIG. 18A is simply an example and other arbitrary arrangement methods may be adopted. In this case, LEDs (a first light source group) constituted by R1, G1, and B1 will be referred to as the RGB-LED (A) 1630. In addition, LEDs (a second light source group) constituted by R2, G2, and B2 will be referred to as the RGB-LED (B) 1640. Spectral spectra of the respective LEDs are shown in FIG. 18B. As shown, the first light source and the second light source of the backlight of the image display device 1600 are designed so as to have different peak wavelengths (spectral spectra). In other words, the backlight has two light sources, namely, the first and second light sources with different peak wavelengths for each color of red, green, and blue. The backlight of each color corresponds to light-emitting unit capable of adjusting a spectral spectrum.

Focusing on red, while the R1 and R2 LEDs both have peaks near the 630 nm wavelength, R2 has a longer peak wavelength than R1. As will be described later, by having the backlight control unit 1620 adjust emission intensities of R1 and R2, a peak wavelength of a spectral spectrum is shifted. A shift amount is determined by a user's color matching function. Therefore, the peak wavelengths of the R1 and R2 LEDs are desirably determined so that a necessary peak wavelength is realized. When peak wavelengths of the R1 and R2 LEDs are denoted by $\lambda_{R1}$ and $\lambda_{R2}$, a peak can be set to an arbitrary wavelength between $\lambda_{R1}$ and $\lambda_{R2}$ by adjusting intensities of the respective LEDs. While the red LEDs have been described above, the same description applies to the green LEDs G1 and G2 and the blue LEDs B1 and B2.

Moreover, in the third embodiment, since an image display device that reproduces color by additive color mixing of the three primary colors of RGB is used as an example, RGB-LEDs are adopted as a light source of a backlight. Alternatively, with an image display device that uses four primary colors additionally including yellow or cyan, a light source that emits light in each primary color is preferably used.

(Liquid Crystal Panel 1650)

The liquid crystal panel 1650 is a display panel capable of varying transmittance of light depending on voltage. The liquid crystal panel 1650 is not self-luminous and displays video by controlling transmittance of light irradiated from a backlight arranged on a rear side of the liquid crystal panel 1650 in accordance with an image signal (image data). A red, green and blue color filter is attached to the liquid crystal panel 1650, and the liquid crystal panel 1650 performs color display using an additive color mixing method by dividing transmitted light into the three primary colors. When displaying green, only light of green pixels is transmitted while light of red and blue pixels is blocked. In addition, when displaying black, black is reproduced by blocking transmitted light of all pixels. In addition, besides a liquid crystal panel, an arbitrary display panel can be adopted as long as the display panel is capable of modifying transmittance in accordance with image signals.

(User Information Inputting Unit 1660)

Figure 19:
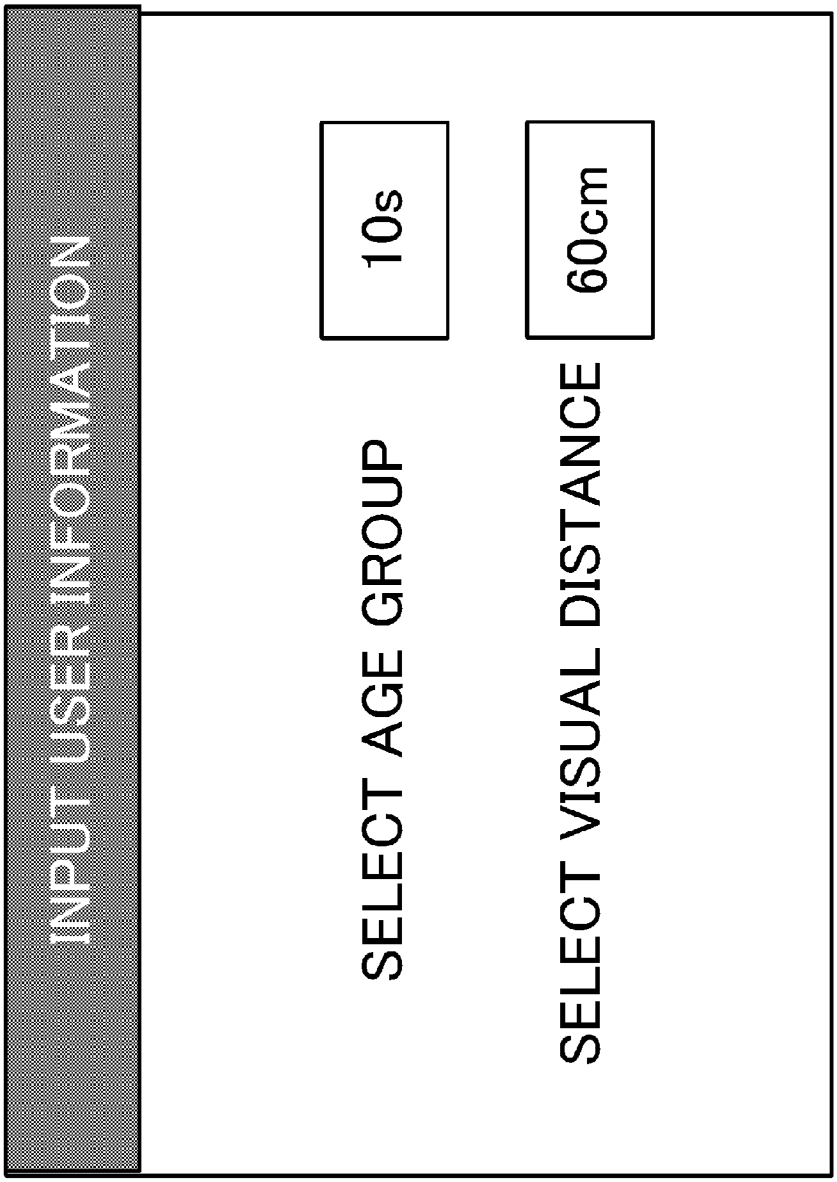
FIG. 19 is a diagram showing a user information setting dialog according to the third embodiment.

The user information inputting unit 1660 is a processing block for inputting information regarding a user that uses the display. The user information inputting unit 1660 accepts information from the user via an input unit such as buttons or switches provided on the display or via a remote controller. As an information input format, a configuration is adopted which involves displaying an input dialog on a screen of the image display device 1600 and having the user input information. In the third embodiment, information inputted by the user is assumed to be an age of the user and a visual distance when viewing the image display device 1600 (a distance between the user and the image display device). FIG. 19 shows an example of a dialog for setting user information.

(Database 1670)

The image display device 1600 includes the database 1670 for acquiring a color matching function corresponding to the age and the visual distance inputted by the user. The database 1670 is configured to output a color matching function corresponding to the inputted age and visual distance. Color matching functions are known to differ among individuals and to change according to age and visual distance. CIE170-1:2006 describes a fluctuation in cone spectral sensitivity in a 2-degree visual field by age group. Changes in color matching functions with aging include a change in which sensitivity of visual cells that sense color increases rapidly after birth but gradually declines after reaching a peak that occurs around the age of 20. Another change that occurs with aging is that visible light within a short wavelength region becomes more easily absorbed and sensitivity in the short wavelength region declines. Other factors also contribute to differences in color matching functions and studies are being carried out from various perspectives. In the third embodiment, focusing on a change in color matching functions due to age and visual distance, the database 1670 manages color matching functions by storing color matching functions associated with age and visual distance.

(Spectral Control Unit 1680)

The spectral control unit 1680 is responsible for a series of processes of calibration performed so as to reproduce accurate color. Specifically, based on the age and the visual distance set on the user information inputting unit 1660, a user's color matching function is acquired from the database 1670. The spectral control unit 1680 further adjusts a spectral spectrum of the backlight and a signal gain with respect to the video signal processing unit 1610 based on a difference between the user's color matching function and a standard color matching function. Details of the calibration processes will be described later.

The spectral control unit 1680 functions as an acquiring unit that acquires a user's color matching function and also as a control unit that adjusts a spectral spectrum of the backlight.

(Spectral Colorimeter 1690)

The spectral colorimeter 1690 is a sensor for adjusting a spectral spectrum and adjusting a signal gain. The spectral colorimeter 1690 is a spectral brightness meter that measures color displayed on the image display device 1600 and outputs data in a spectral format. Light incident to the spectral colorimeter 1690 is divided by an internal diffraction grating so that light intensity can be measured per wavelength. For example, the spectral colorimeter 1690 has a measuring range of 380 nm to 720 nm and a resolution of 1 nm. The spectral colorimeter 1690 is communicably connected with the image display device 1600 by a USB cable or the like and is configured to be capable of acquiring spectral data measured by the spectral control unit 1680. The spectral control unit 1680 is capable of calculating an XYZ stimulus value by multiplying the measured spectral data with a color matching function.

(Processing Operation Flow)

Figure 17:
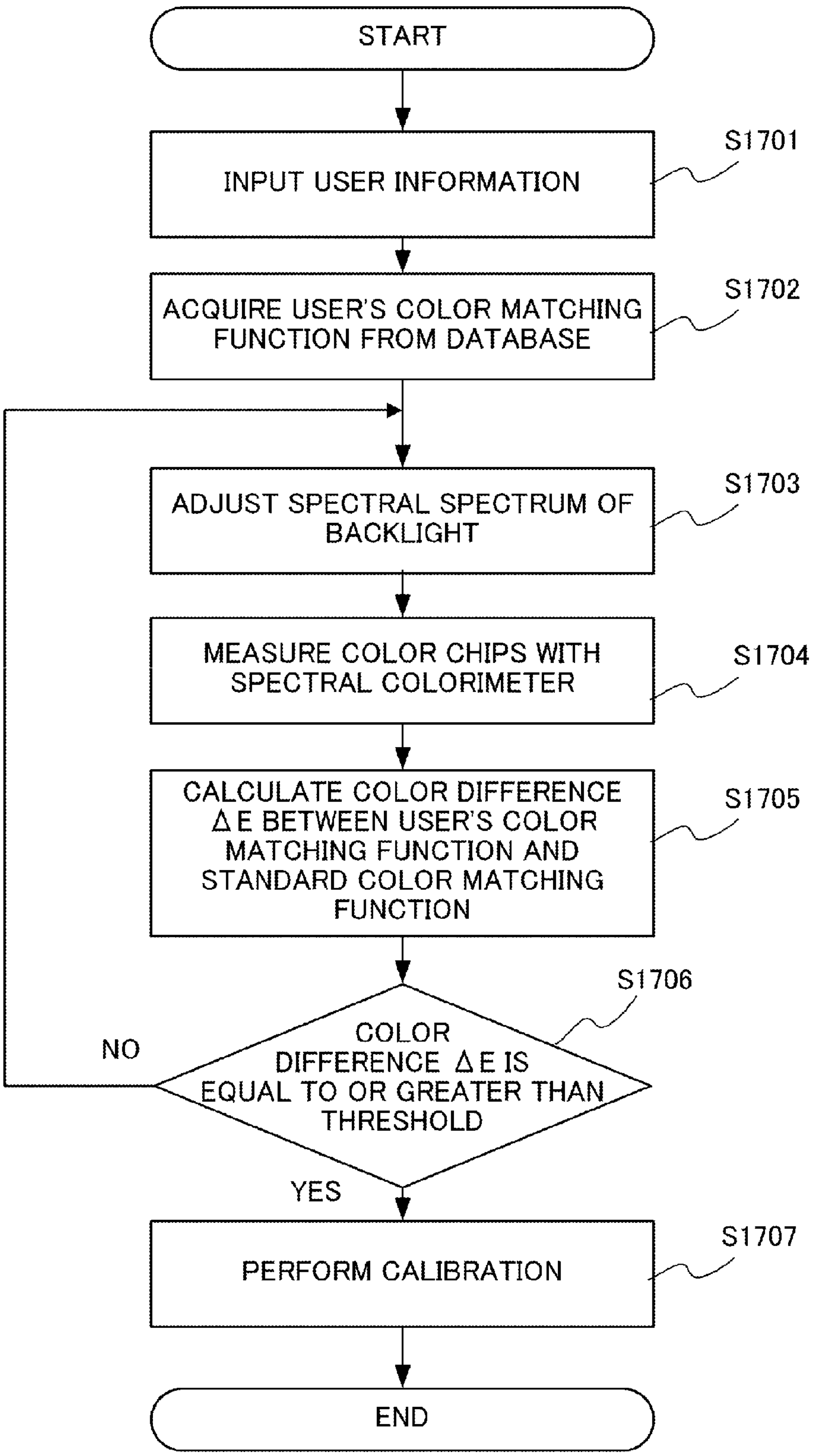
FIG. 17 is a diagram showing a processing flow according to the third embodiment.

Next, a processing operation flow of color adjustment based on user information by the image display device 1600 will be described with reference to the flow chart shown in FIG. 17.

In step S1701, user information necessary for the user to perform color adjustment is set. When a user information setting process is started, the user information inputting unit 1660 displays a user information setting dialog such as that shown in FIG. 19 as an OSD. Moreover, buttons or the like are provided on a main body of the image display device 1600. The user can display the OSD dialog (start of a setting process) or set user information by operating the buttons. Setting items in the third embodiment are assumed to be the age and a visual distance of the user. In addition, the third embodiment adopts a configuration in which a user's color matching function is acquired based on the age and the visual distance of the user. Parameters other than those described above may be adopted as items to be inputted as user information as long as such parameters affect the color matching function. For example, parameters such as nationality and gender may be added.

In step S1702, the user information inputting unit 1660 sends information regarding the age and the visual distance inputted by the user to the spectral control unit 1680. The spectral control unit 1680 acquires a color matching function corresponding to the age and the visual distance from the database 1670. When a color matching function conforming to the age and the visual distance of the user does not exist in the database 1670, a color matching function corresponding to a most similar age and visual distance may be acquired or a color matching function may be calculated by an interpolation process from a plurality of color matching functions corresponding to similar ages and visual distances. Furthermore, the spectral control unit 1680 acquires a standard color matching function that is defined by the CIE from the database 1670. The standard color matching function is assumed to be a 2-degree visual field color matching function defined as the CIE 1937 standard colorimetric observer. Hereinafter, a color matching function based on user information will be referred to as a user's color matching function and a 2-degree visual field color matching function to be used as a standard will be referred to as a standard color matching function.

Step S1703 is an adjustment process of a spectral spectrum of the image display device 1600 based on a deviation between the user's color matching function and the standard color matching function. Examples of methods of adjusting a spectral spectrum include a method of compositing light emitted from a plurality of LEDs. The backlight of the image display device 1600 is provided with two LEDs with different spectral spectra (peak wavelengths) for each color of RGB. By varying an emission intensity ratio of LEDs of a same color but having different spectral spectra, the spectral control unit 1680 shifts a peak wavelength of the spectral spectrum of the color. For example, two LEDs B1 and B2 with different spectral spectra are provided for blue. In this case, by changing the emission intensity ratio of B1 and B2, a composite spectrum of B1 and B2 can be changed and a peak wavelength can be shifted.

Figure 20:
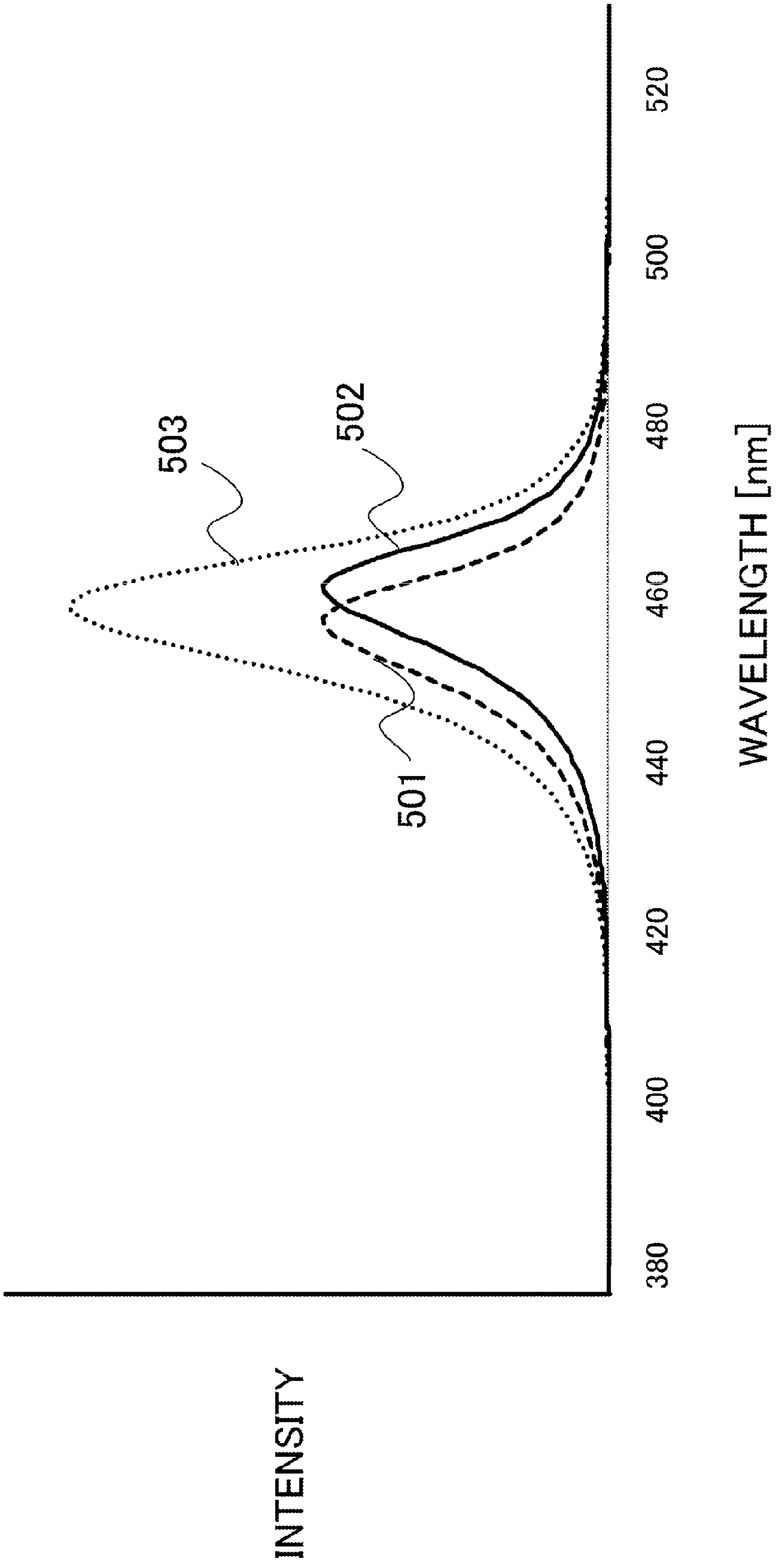
FIG. 20 is a diagram showing a composite spectrum of LEDs according to the third embodiment.

Composition of spectral spectra will now be described with reference to FIG. 20. The spectral spectra shown in FIG. 20 include a spectrum 501 of the blue LED B1 included in the LED (A) 1630, a spectrum 502 of the blue LED B2 included in the LED (B) 1640, and a spectral spectrum 503 representing a composition of the two. When shifting the peak wavelength of the composite spectrum toward a long wavelength side, a light intensity of the blue LED B1 having a wavelength peak on the short wavelength side is reduced and a light intensity of the blue LED B2 having a wavelength peak on the long wavelength side is increased. After shifting the peak wavelength of the composite spectrum, the backlight control unit 1620 increases or reduces PWM output values of the blue LED (A) 501 and the blue LED (B) 502 in a state where a ratio of the light intensities of the LEDs are kept constant so that a prescribed brightness is achieved. In this manner, the spectral spectrum of the image display device 1600 can be controlled.

Figure 21A:
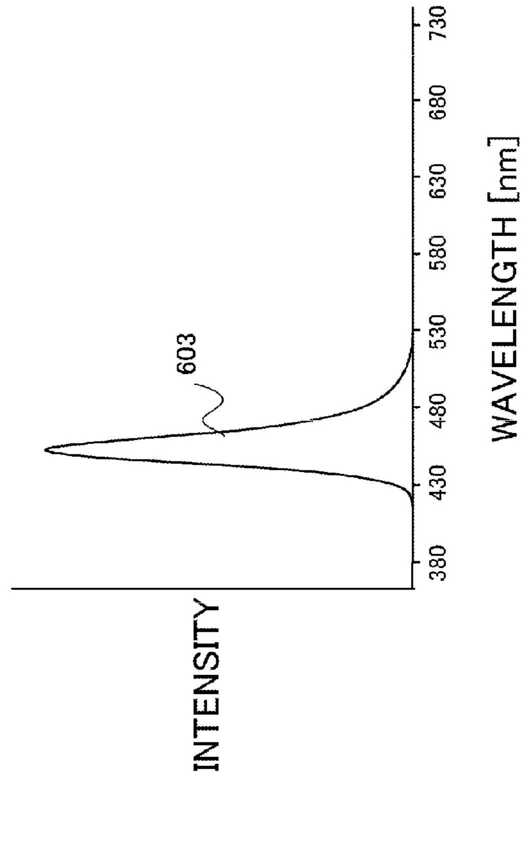
FIGS. 21A and 21B are diagrams showing a spectral spectrum of blue and a color matching function according to the third embodiment.
Figure 21B:
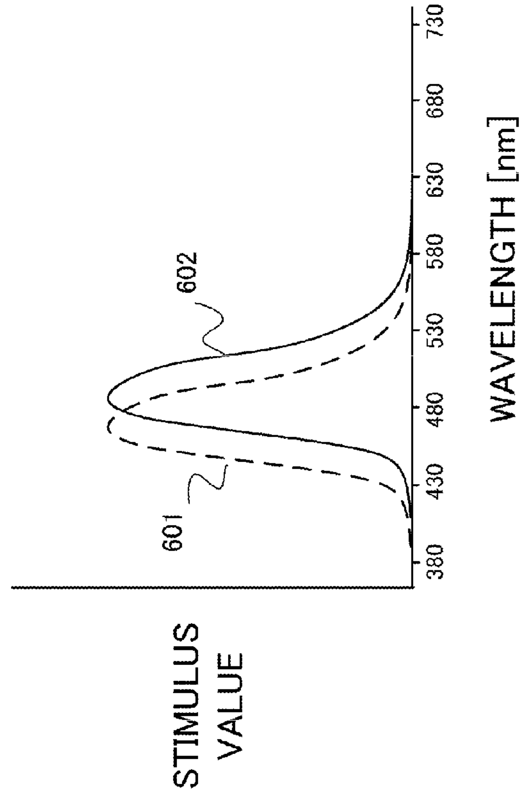
Figure 22A:
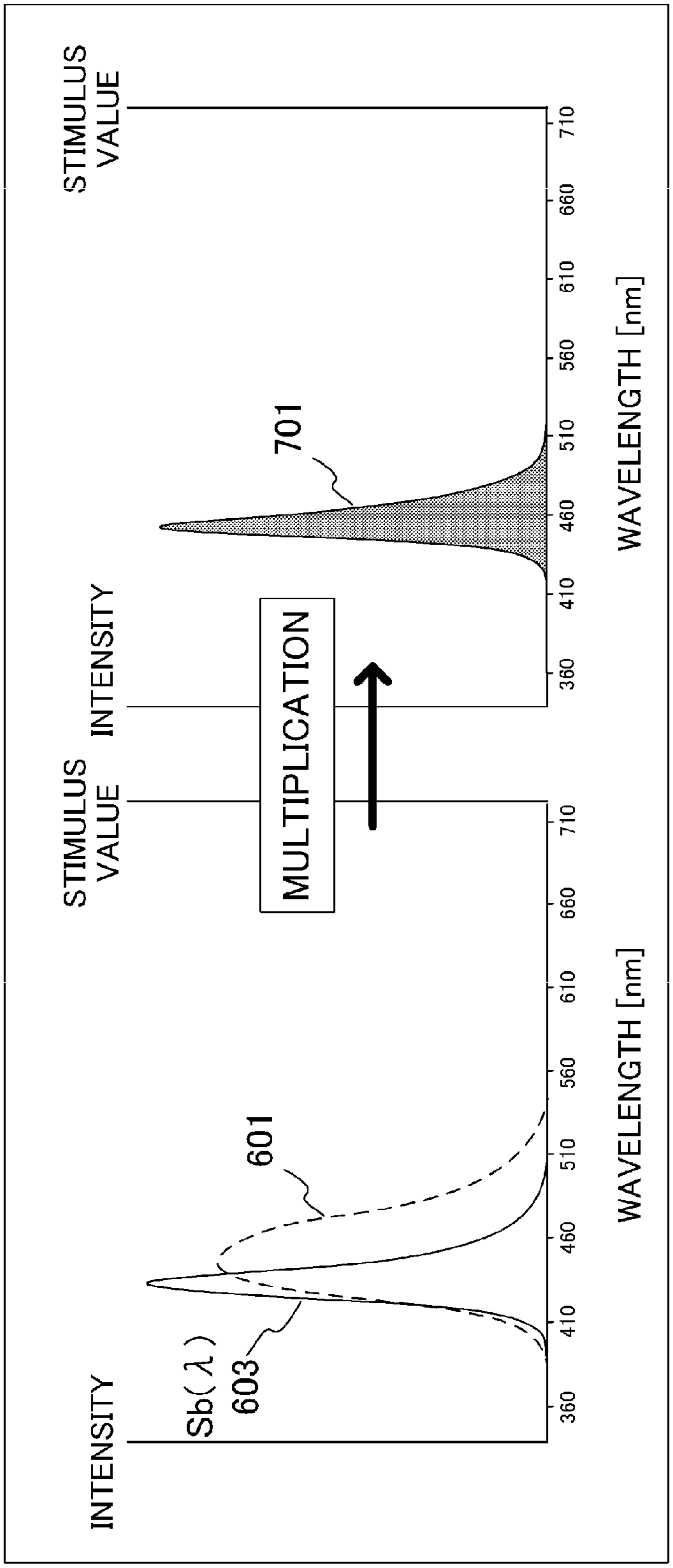
FIGS. 22A to 22C are diagrams illustrating a method of adjusting a spectral spectrum according to the third embodiment.
Figure 22B:
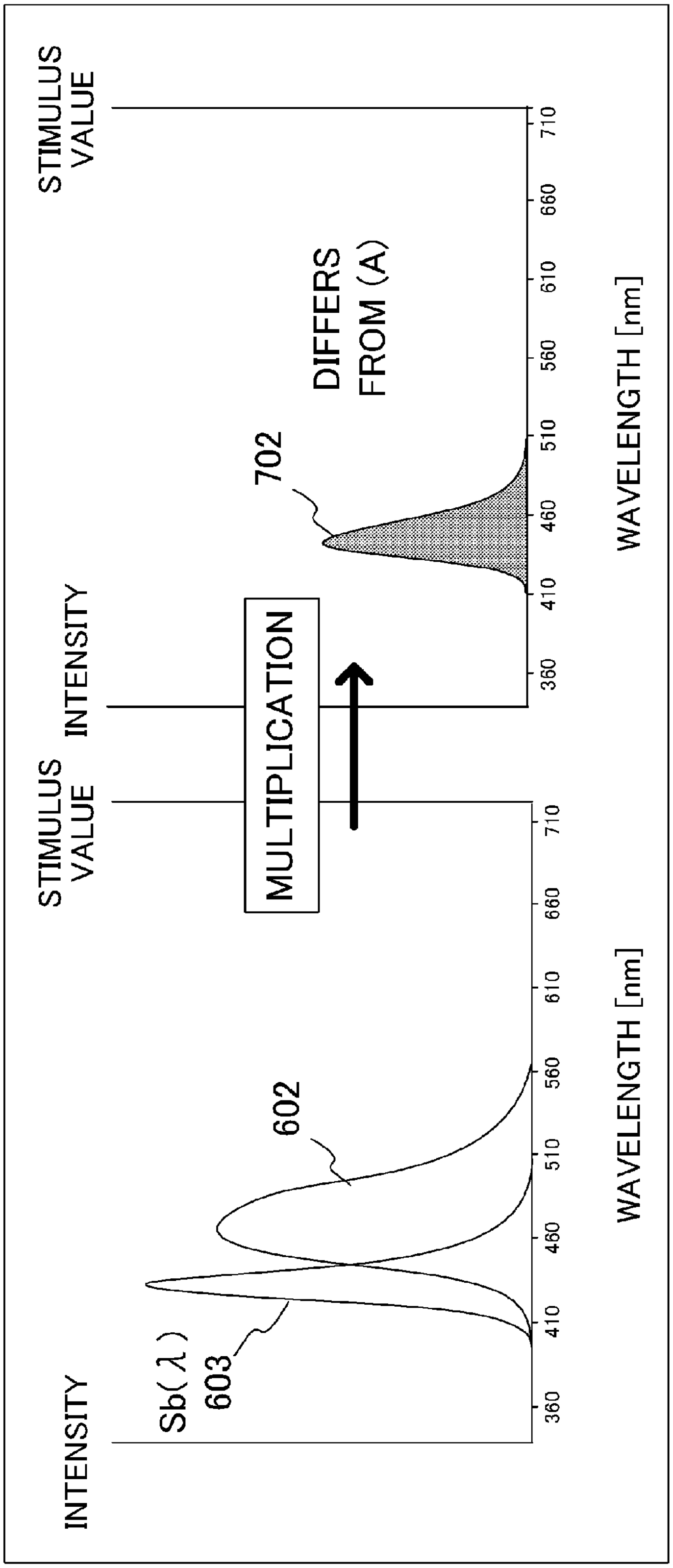
Figure 22C:
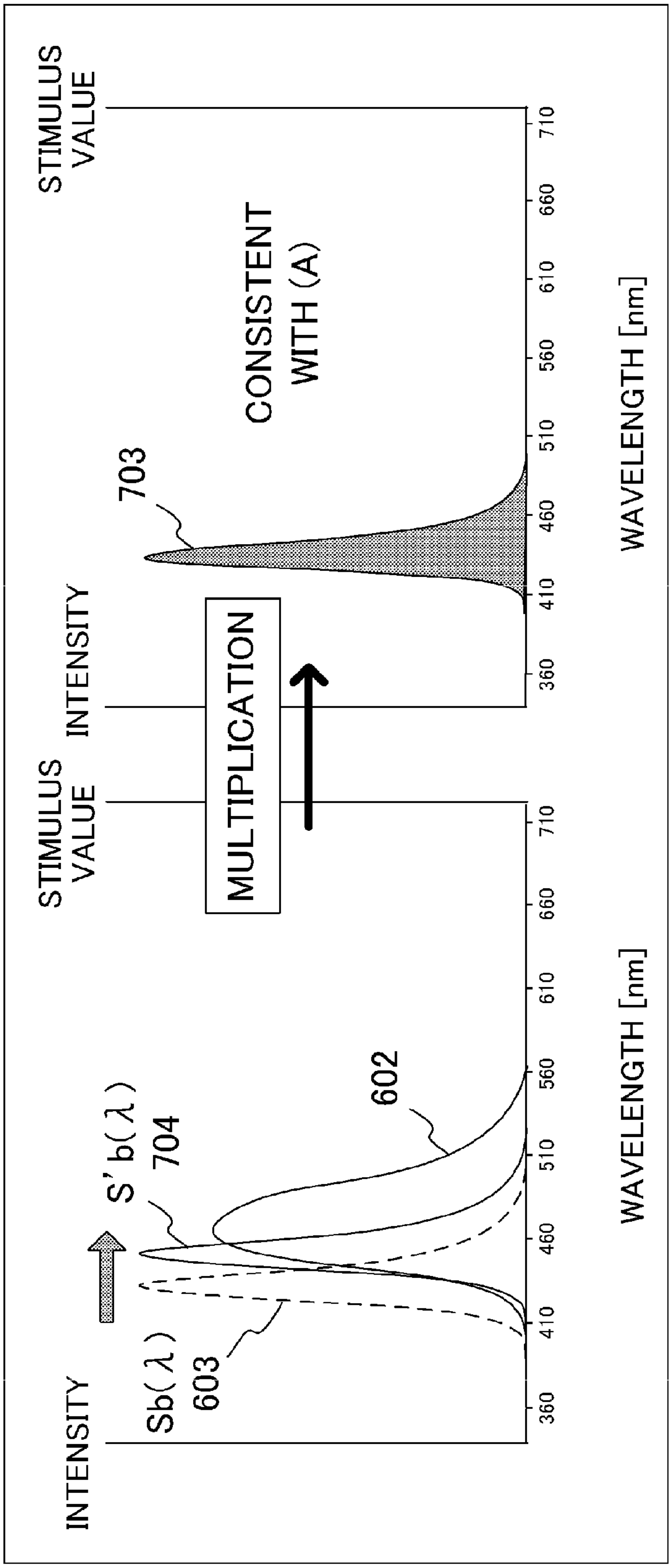

An adjustment process in a case where the user's color matching function differs from the standard color matching function will be described in detail with reference to FIGS. 21A and 21B. The description will be given with a focus on an operation for adjusting the spectral spectra of the blue LEDs to reduce color difference. FIG. 21A shows a spectral spectrum 603 of the blue LED B1 and FIG. 21B shows a standard color matching function 601 and a user's color matching function 602. In this example, the user's color matching function 602 represents a shift from the standard color matching function 601 toward the long wavelength side. It is assumed that a shift of 3 nm toward the long wavelength side has occurred. Next, FIGS. 22A to 22C shows a spectral spectrum Sb(λ) when light is only emitted from the blue LED B1 and a blue color matching function z(λ). FIG. 22A shows the spectral spectrum Sb (λ) 603, the standard color matching function 601, and an integration value 701 obtained by multiplying the two together. FIG. 22B shows the spectral spectrum Sb(λ) 603, the user's color matching function 602 having shifted from the standard color matching function 601 toward the long wavelength side, and an integration value 702 obtained by multiplying the two together. FIG. 22C shows an adjusted spectral spectrum S'b(λ) 704, the user's color matching function 602, and an integration value 703 obtained by multiplying the two together. Referring to FIGS. 22A and 22B, a shift of the user's color matching function 602 toward the long wavelength side with respect to the standard color matching function 601 has obviously created a difference between the integration value 702 and the integration value 701. This difference between integration values is perceived by a person as a difference in color. In consideration thereof, by adjusting the peak wavelength of the spectral spectrum of the image display device 1600 in accordance with a deviation of peak wavelengths of color matching functions, a difference in color caused by a difference in the color matching function for each user can be suppressed. By shifting a peak wavelength of a spectral spectrum by an amount corresponding to a deviation between the standard color matching function and the user's color matching function, the integration value 703 can be adjusted to approximately equal the standard integration value 701 as shown in FIG. 22C. By shifting a peak wavelength of a spectral spectrum by an amount equal (in this example, +3 nm) to the deviation between the peak wavelengths of the color matching functions, the integration value 703 can be adjusted to approximately equal the standard integration value 701.

Moreover, while a case where light is only emitted from the blue LED B1 is used as a standard and light is emitted by the blue LED B2 for performing an adjustment in accordance with a deviation in color matching functions, such operations need not necessarily be performed. For example, a case where light is emitted from the LEDs B1 and B2 at a prescribed emission intensity ratio (for example, 1:1) may be used as the standard. In other words, the emission intensity ratio of B1 and B2 may be adjusted so that a color sensed by the user (corresponding to the user's color matching function) becomes equal to a color sensed by a standard user (corresponding to the standard color matching function) when light is emitted from B1 and B2 at the prescribed ratio. Accordingly, a peak wavelength of a spectral spectrum can be shifted toward both the long wavelength side and the short wavelength side.

Next, in step S1704, in order to verify an adjustment result of a spectral spectrum, the spectral control unit 1680 measures color chips using the spectral colorimeter 1690 to determine a color difference ΔE. First, the spectral control unit 1680 requests the video signal processing unit 1610 to display color chips. The video signal processing unit 1610 displays color chips of red, green, blue, and white on the liquid crystal panel 1650. In addition, the spectral control unit 1680 acquires spectral data S(λ) of each color chip from the spectral colorimeter 1690.

In step S1705, based on spectral data of each color chip acquired in this manner, the spectral control unit 1680 calculates a difference in appearance of color from an average user or, in other words, a color difference between a standard color matching function and a user's color matching function. The spectral control unit 1680 calculates an XYZ stimulus value when the user's color matching function is applied to the measured spectral data S(λ) and respective X'Y'Z' stimulus values of red, green, and blue color chips when the standard color matching function is applied. Expression 5 represents a calculation formula of the XYZ stimulus value and Expression 6 represents a calculation formula of the X'Y'Z' stimulus values, where $x_{user}(\lambda)$, $y_{user}(\lambda)$, and $z_{user}(\lambda)$ denote user's color matching functions and $x_{base}(\lambda)$, $y_{base}(\lambda)$, and $z_{base}(\lambda)$ denote standard color matching functions.

$$X = k\sum_{\lambda}(x_{user}(\lambda)\times s(\lambda)) \quad \text{(Expression 5)}$$

$$Y = k\sum_{\lambda}(y_{user}(\lambda)\times s(\lambda))$$

$$Z = k\sum_{\lambda}(z_{user}(\lambda)\times s(\lambda))$$

$$X' = k\sum_{\lambda}(x_{base}(\lambda)\times s(\lambda)) \quad \text{(Expression 6)}$$

$$Y' = k\sum_{\lambda}(y_{base}(\lambda)\times s(\lambda))$$

$$Z' = k\sum_{\lambda}(z_{base}(\lambda)\times s(\lambda))$$

In step S1706, when the color difference ΔE obtained from the stimulus values equals or exceeds a threshold, the operation flow returns to the process of S1703 to once again adjust the spectral spectrum by varying an adjustment amount of the spectral spectrum such as a wavelength (nm) by which the spectral spectrum is to be shifted. When the color difference ΔE is smaller than the threshold, adjustment of the color difference is completed and the operation flow proceeds to the calibration process in S1707. For example, when setting a threshold color difference of ΔE=2.0, the operation flow proceeds to S1707 when ΔE=1.3. In this manner, while adjustment and verification of a spectral spectrum are repeated until the color difference ΔE falls below the threshold, when the color difference ΔE does not fall below the threshold even after several repetitions, a smallest color difference among the several repetitions is adopted as an adjustment value and the operation flow proceeds to S1707. Moreover, for the second and subsequent spectral spectrum adjustment processes, the peak wavelength (the emission intensity ratio of the two LEDs) may be varied as appropriate. The verification process is performed because it is difficult to adjust a spectral spectrum with high accuracy. In addition, since a user's color matching function is not always a result of simply shifting the standard color matching function, a color difference is not always eliminated by simply shifting the peak of a spectral spectrum by an amount equaling a difference in peaks between color matching functions. In consideration thereof, by repeating adjustment and verification, a spectral spectrum having a color difference in a permissible range can be realized.

After adjusting the spectral spectrum of the image display device 1600 as described above, in step S1707, the spectral control unit 1680 performs calibration by adjusting RGB signal gains in order to reproduce a more accurate color. For the calibration, the spectral control unit 1680 displays a plurality of color chips on the image display device 1600 and measures a spectral spectrum with the spectral colorimeter 1690. Respective XYZ stimulus values are calculated from an integration value of the measured spectral spectrum and the user's color matching function, a gain of an RGB video signal is adjusted so that the obtained XYZ stimulus values become consistent with values set as calibration targets, and the XYZ stimulus values are outputted to the liquid crystal panel 1650. A calibration target as used herein refers to a color gamut, a color temperature, gamma, or brightness. The spectral control unit 1680 outputs the XYZ stimulus values calculated from the color chips to the video signal processing unit 1610. The video signal processing unit 1610 performs gain adjustment of the RGB video signal.

A display color of the image display device 1600 is calibrated as described above. According to the third embodiment, a change in color appearance attributable to a difference in color matching functions among individuals can be reduced and a more stable color can be displayed. As a result, confirmation can be performed more accurately during soft proofing or the like.

(Modification)

While a color matching function is set by inputting user information such as age according to the description given above, other arbitrary methods can be adopted as long as a color matching function in accordance with the user can be obtained. For example, user information of each user can be stored in association with a user ID or biometric information (a facial image, a fingerprint, an iris, or the like), whereby user information can be acquired based on a user ID or biometric information acquired from the user. In addition, the face of the user may be photographed and information such as age, gender, or the like may be estimated using a face authentication technique. In a similar manner, a visual distance of the user may also be acquired by image processing or by using a range sensor. Furthermore, a user's color matching function may be measured, and when an accurate color matching function can be acquired, data of the color matching function can be inputted as-is. For example, graph data of a color matching function can conceivably be inputted as-is. Alternatively, a user's color matching function may be stored in advance in association with a user ID or biometric information, whereby the user's color matching function may be acquired based on the user ID or biometric information acquired from the user.

In addition, an LED and a laser light source with a narrower half-value width of a spectral spectrum may be combined with one another as a light source of a backlight. Alternatively, a white LED or a cold cathode fluorescent lamp (CCFL) can also be adopted as the backlight. In other words, an RGB-LED, a laser light source, a white LED, a CCFL, or the like can be adopted as a light source group included in at least any of the first and second light source groups. Even in this case, a difference in color appearance due to individual variability can be suppressed by repeating adjustment and verification of a spectral spectrum and controlling a color difference so as to decrease. Furthermore, while an example of combining two backlights has been described above, three or more backlights (light source groups) with different spectral spectra may be combined and an emission intensity ratio of the backlights may be controlled.

In addition, while adjustment of a spectral spectrum is performed for all of a plurality of colors (red, green and blue) in the description above, adjustment of a spectral spectrum may be performed only for a part of the colors. For example, adjustment of a spectral spectrum may be performed only for a color (for example, blue) having a noticeable difference in color appearance due to individual variability. In this case, a plurality of backlights (LEDs or the like) with different spectral spectra are not required for colors that are not objects of the adjustment and a single backlight is to suffice. Moreover, a combination of colors emitted by a light source need not necessarily be limited to a combination of red, green and blue. Alternatively, a combination of four colors additionally including yellow or cyan or a combination of a plurality of other arbitrary colors may be adopted.

Furthermore, a spectral spectrum need not necessarily be changed by using a plurality of light sources with different spectral spectra. An arbitrary light source can be adopted as long as the spectral spectrum of light emitted by the light source is variable. For example, a wavelength-variable LED or a wavelength-variable laser that outputs light with a variable wavelength can conceivably be adopted as a light source. In this case, the backlight control unit may control a spectral spectrum of outputted light by controlling an output wavelength of the light source.

In addition, while the third embodiment adopts a configuration in which, after adjusting a spectral spectrum, color chips are measured to verify that a color difference is within a permissible range, when high-accuracy adjustment can be performed, adjustment of a spectral spectrum may be performed only once and the verification steps of S1704 to S1706 may be omitted.

Furthermore, while a difference in peaks between a user's color matching function and a standard color matching function is calculated and a peak of a spectral spectrum of a backlight is shifted in accordance with the difference in the third embodiment, this is merely an example of an adjustment method. As long as a color difference (ΔE) due to a difference between color matching functions can be suppressed, any adjustment method may be used. For example, the spectral spectrum of the backlight may be appropriately changed a plurality of times to perform measurement and verification, whereby a spectral spectrum of the backlight for which the color difference ΔE is within a threshold may be selected. In addition, instead of shifting a peak wavelength of a spectral spectrum, an emission intensity of an LED may be changed. This is because changing spectral spectrum intensity causes a change in stimulus value. In other words, the spectral spectrum of the backlight may be adjusted so that an integration value (Expression 5) of a product of the adjusted spectral spectrum and a user's color matching function becomes approximately equal to an integration value (Expression 6) of a product of the standard spectral spectrum and the standard color matching function.

In addition, while the description above has been given using an example of a liquid crystal display, the present invention can be applied to an arbitrary device as long as the device includes a light-emitting unit and performs image display by allowing light emitted by the light-emitting unit to be transmitted at a transmittance in accordance with an image signal.

(Fourth Embodiment)

Figure 23:
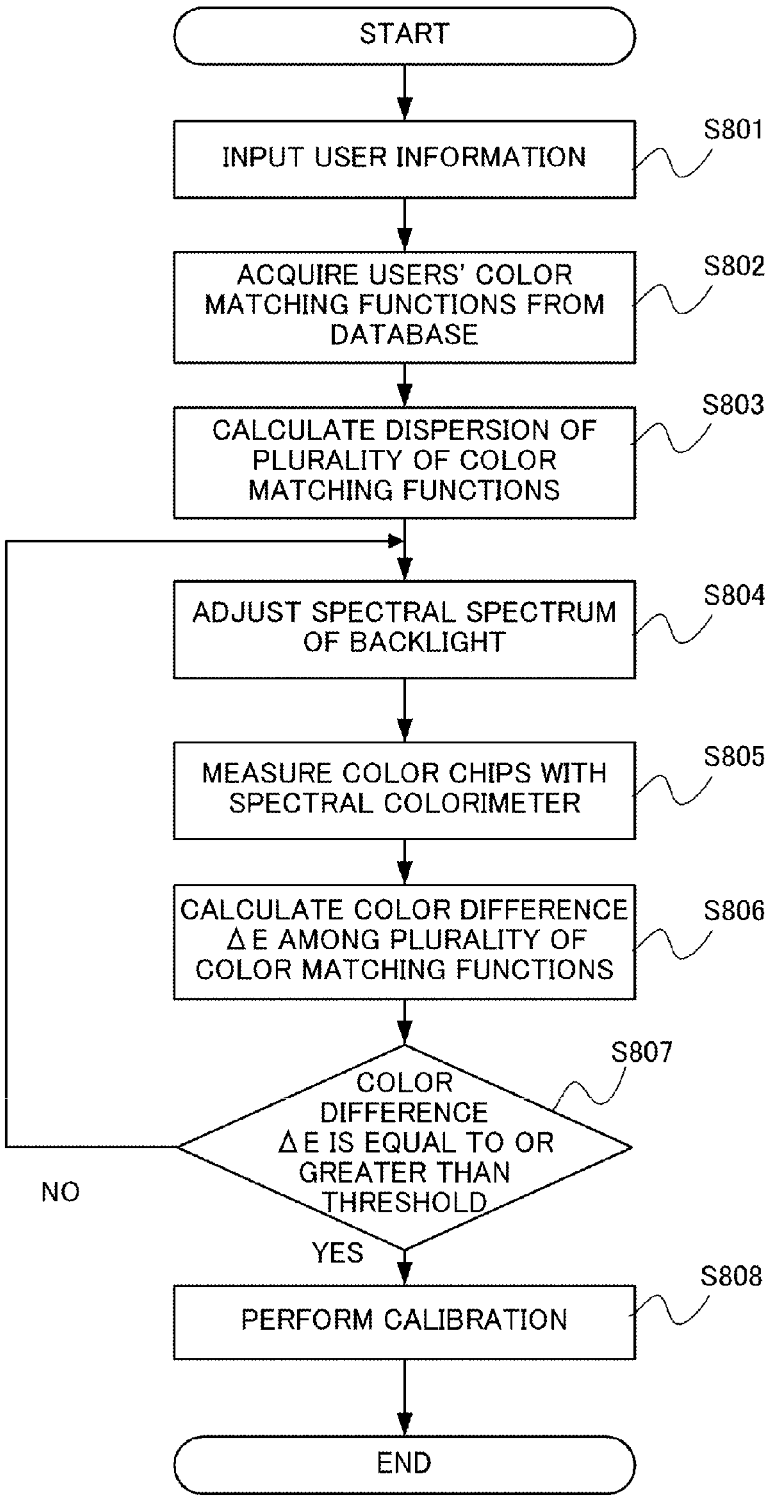
FIG. 23 is a diagram showing a processing flow according to the fourth embodiment.

In a fourth embodiment, a difference in color appearance among a plurality of users is reduced when the plurality of users view a same monitor at the same time. Since processing blocks of an image display device according to the fourth embodiment are similar to those of the third embodiment, a description of the processing blocks will be omitted. Hereinafter, a processing operation flow according to the fourth embodiment will be described with reference to FIG. 23.

(Processing Operation Flow)

First, in step S801, information of a plurality of users is set. The user information inputting unit 1660 displays a dialog for inputting age and visual distance for each user on the OSD of the image display device 1600. A case where two users view a same monitor at the same time will now be described as an example. In this case, user information of the two users, namely, a user A and a user B is inputted. Let us assume that the user A and the user B are both in their 20s, the visual distance of the user A is 50 cm, and the visual distance of the user B is 100 cm. In addition to deviation due to individual variability, colors sensed by persons are also known to change due to a variation in vision (a size of a viewed object). In the fourth embodiment, a process for reducing a difference in color appearance when a plurality of user with average color matching functions view the image display device 1600 at different visual distances will be described as an example.

Figure 3:
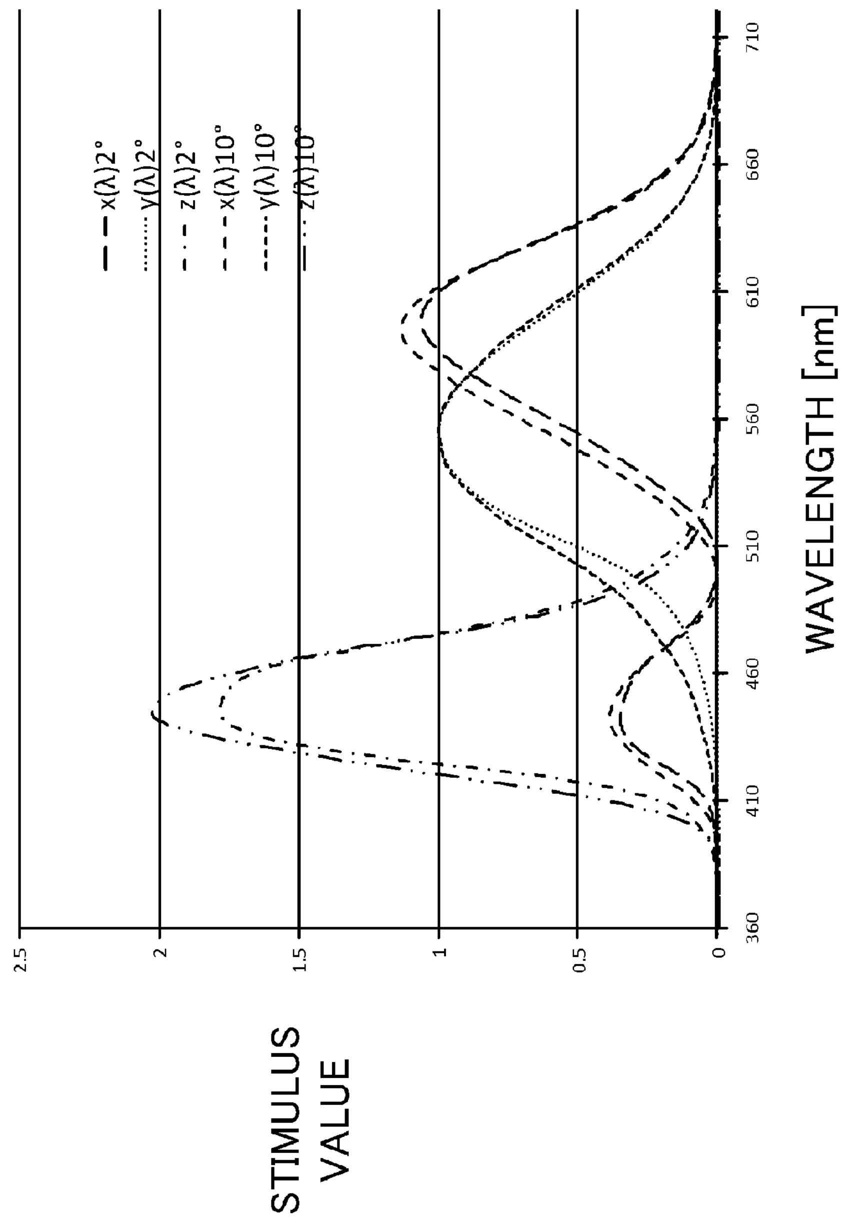
Fig.3 PRIOR ART
FIG. 3 is a diagram showing color matching functions of a 2-degree visual field and a 10-degree visual field.
Figure 4:
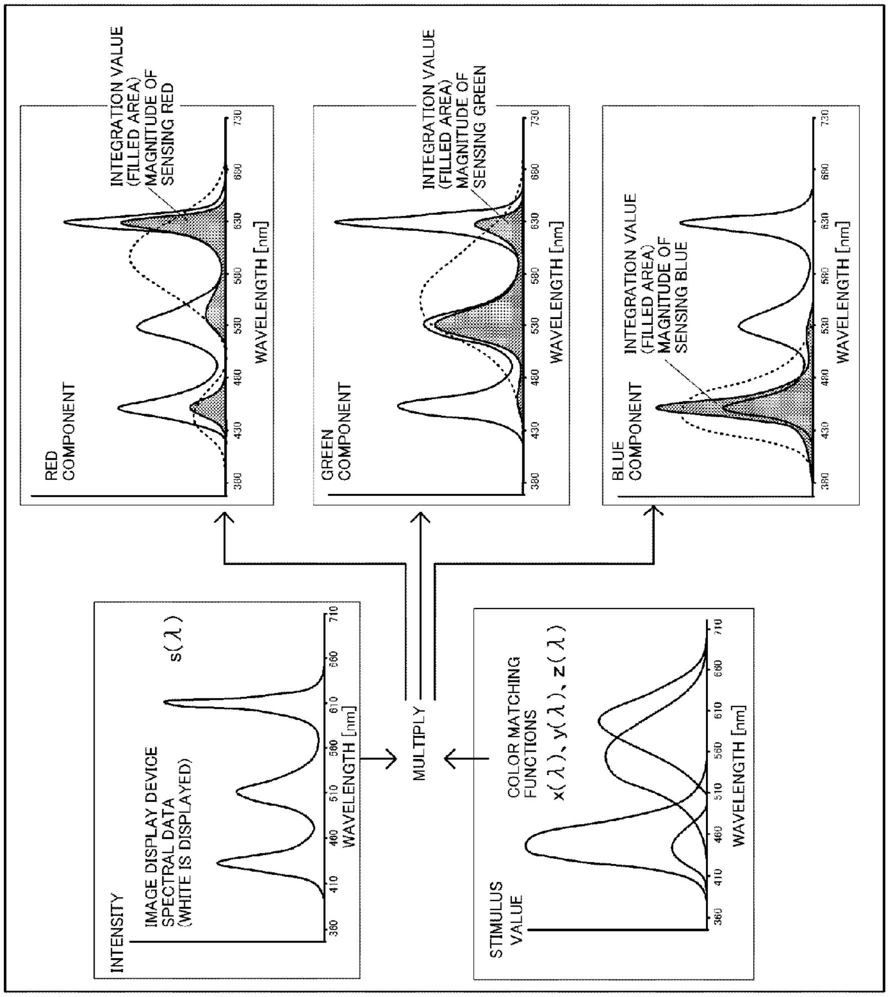
Fig.4 PRIOR ART
FIG. 4 is a diagram showing a mechanism by which a person perceives color on a display.

In step S802, the user information inputting unit 1660 sends information on the age and the visual distance inputted by the users to the spectral control unit 1680. The spectral control unit 1680 acquires color matching functions corresponding to the age and the visual distance of the plurality of persons from the database 1670. Let us assume that the color matching function of the user A is a 2-degree visual field and the color matching function of the user B is a 10-degree visual field. FIG. 3 shows color matching functions of a 2-degree visual field and a 10-degree visual field. Details of a process for determining a color matching function from information set by a user are similar to the third embodiment.

In step S803, the spectral control unit 1680 calculates a deviation of color matching functions between the user A and user B for each wavelength. FIG. 8 shows the deviation between the color matching functions. FIG. 8 represents difference values $\Delta x(\lambda)$, $\Delta y(\lambda)$, and $\Delta z(\lambda)$ obtained by subtracting the 2-degree visual field color matching function of the user A from the 10-degree visual field color matching function of the user B being plotted for each wavelength for each color of red, green and blue. Expression 7 represents a difference between color matching functions of the 10-degree visual field and the 2-degree visual field at a given wavelength. Accordingly, FIG. 8 is a graph representation of differences calculated for each wavelength from the color matching functions of the 2-degree visual field and the 10-degree visual field shown in FIG. 3.

[Expression 7]

$$\Delta x(\lambda)=x_{10°}(\lambda)-x_{2°}(\lambda)$$

$$\Delta y(\lambda)=y_{10°}(\lambda)-y_{2°}(\lambda)$$

$$\Delta z(\lambda)=z_{10°}(\lambda)-z_{2°}(\lambda)$$

In the fourth embodiment, the effect of a deviation of color matching functions between users is reduced by matching peak wavelengths of LEDs to a wavelength region with a small difference (this can also be paraphrased as a small deviation or a small variation). Referring to FIG. 8, the difference of $\Delta x(\lambda)$ representing red sensitivity is small near the 640 nm wavelength. The difference of $\Delta y(\lambda)$ representing green sensitivity is small near the 550 nm wavelength. The difference of $\Delta z(\lambda)$ representing blue sensitivity is small near the 470 nm wavelength. In other words, the spectral spectrum is adjusted in a next process so that these wavelength regions and the peak wavelengths of the LEDs conform to one another. In addition, when there are three or more users, dispersions (variations) of $\Delta x(\lambda)$, $\Delta y(\lambda)$, and $\Delta z(\lambda)$ are calculated for each wavelength and a wavelength region with a small variation is calculated for each of red, green and blue. In this case, a wavelength region with a small variation refers to a wavelength region with a small variation within a prescribed wavelength range that is determined in advance for each color of red, green and blue. For example, in the case of red, a wavelength region with a small variation refers to a wavelength region with a small variation within a wavelength region of several nm to several 10 nm near 640 nm. In other words, a wavelength region with a small variation in the case of red refers to a wavelength region with a small variation within a wavelength region that can be adjusted using the red LEDs R1 and R2.

Figure 24:
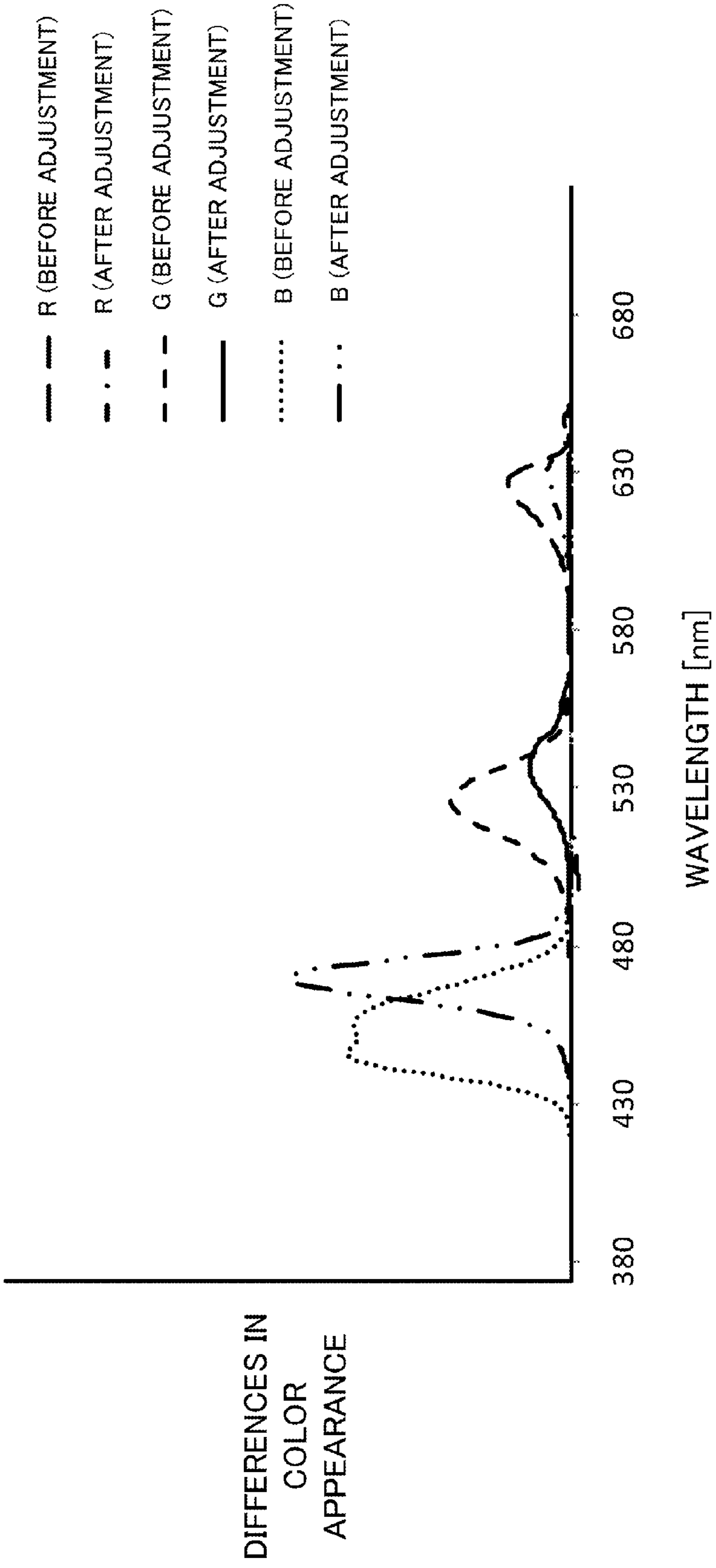
FIG. 24 is a diagram showing spectral spectra of LEDs before and after adjustment according to the fourth embodiment.

In step S804, the spectral control unit 1680 adjusts the spectral spectrum of the image display device 1600 based on a difference between the users' color matching functions or, in other words, a difference between color matching functions of a 2-degree visual field and a 10-degree visual field. In order to adjust the spectral spectrum, the spectral control unit 1680 creates composite spectra by varying emission ratios of light intensity of LEDs of the same color but with different spectral spectra and shifts a peak wavelength of the spectral control unit of each color to a wavelength region with a small difference between users' color matching function. By adjusting so that a peak of a composite spectrum falls within a wavelength region with a small difference (dispersion), a difference in color appearance between users can be reduced. Therefore, in the case of the example shown in FIG. 8, the peak wavelength of the red composite spectrum is shifted to near 640 nm, the peak wavelength of the green composite spectrum is shifted to near 550 nm, and the peak wavelength of the blue composite spectrum is shifted to near 470 nm. FIG. 24 shows differences in color appearance between the user A and the user B as integrations. When the integration (area) is small, colors appear to be the same between the users. FIG. 24 shows color appearances for each color before and after adjusting the composite spectrum. A comparison of the two reveals that differences in color appearance are smaller after the adjustment.

After the spectral control unit 1680 adjusts the peak wavelengths of the composite spectra, the backlight control unit 1620 adjusts a PWM output value in a state where a ratio of light intensities of the LEDs is kept constant so as to attain a prescribed brightness.

In step S805, in order to verify an adjustment result of the spectral spectrum, the spectral control unit 1680 measures color chips using the spectral colorimeter 1690 to determine a color difference ΔE. First, the spectral control unit 1680 requests the video signal processing unit 1610 to display color chips. The video signal processing unit 1610 displays color chips of red, green, blue, and white on the liquid crystal panel 1650. In addition, the spectral control unit 1680 acquires spectral data $S(\lambda)$ of each color chip from the spectral colorimeter 1690.

In step S806, the spectral control unit 1680 acquires spectral data $S(\lambda)$ of each color chip acquired in this manner and calculates a difference in color appearance between the users or, in other words, calculates a color difference between the users using color matching functions. The spectral control unit 1680 acquires the color difference between the users from XYZ stimulus values when applying the plurality of color matching functions of the user A and user B to the spectral data $S(\lambda)$. In other words, a color difference ΔE (A−B) between the user A and the user B is calculated.

In step S807, in a similar manner to the third embodiment, when a maximum value of the color difference ΔE (A−B) equals or exceeds a threshold, the operation flow returns to the process of S803 to repeat adjustment and verification of the spectral spectra. When the maximum value of the color difference ΔE (A−B) is smaller than the threshold, the operation flow proceeds to the process of S808 to perform calibration using RGB signal gains. While a case where there are two users has been explained in the present example, for example, when there are three users, a maximum value among a color difference ΔE (A−B) between a user A and a user B, a color difference ΔE (B−C) between the user B and a user C, and a color difference ΔE (A−C) between the user A and the user C is set as a determination object.

After adjusting the spectral spectrum and the brightness of the image display device 1600 as described above in step S807, the spectral control unit 1680 performs calibration in a similar manner to the third embodiment so that accurate color can be reproduced.

As described above, even if there are a plurality of users viewing the image display device 1600, by shifting peak wavelengths of LEDs to wavelength regions with a small difference (dispersion) between color matching functions of the users, a difference in color appearance can be reduced.

Moreover, a case where a plurality of users belong to a same age group and, accordingly, the color matching functions of the plurality of users change only depending on visual distances has been described above as an example. However, it should be apparent that similar processes can be performed even in a case where only the age groups differ or a case where both the age groups and visual distances differ. According to the fourth embodiment, as long as color matching functions of the plurality of users can be obtained, a method of acquiring (determining) the color matching functions may be arbitrary.

In addition, modifications similar to those applicable to the third embodiment can be applied to the fourth embodiment.

The description presented above illustrates the present invention by way of example and is not intended to limit the present invention. Accordingly, various modifications can be made to the configurations described above within the technical scope of the present invention.

(Other Embodiments)

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-034802, filed on Feb. 25, 2013, and Japanese Patent Application No. 2013-047564, filed on Mar. 11, 2013, which are hereby incorporated by reference herein in their entirety.

What is claimed is:

1. An image display device comprising:

a light-emitting unit including a first light source and a second light source;

a setting unit configured to set a display mode of the image display device to any one of a plurality of display modes;

a control unit configured to control to light the first light source based on the display mode set by the setting unit and to control to light the second light source based on the display mode set by the setting unit; and a display panel that is illuminated by the light-emitting unit, wherein a difference between color matching functions of plural visual angles in a peak wavelength of a spectrum of the first light source is smaller than that of the second light source, and wherein the control unit is configured to light the first light source in a case where the setting unit sets a first display mode for suppressing a difference in color appearance between the plural visual angles.

2. The image display device according to claim 1, wherein a color gamut which is determined on the display panel by lighting the second light source is wider than a color gamut which is determined on the display panel by lighting the first light source, and wherein the control unit is configured to light the second light source in a case where the setting unit sets a second display mode for prioritizing color reproducibility on the display panel.

3. An image display device comprising:

a light-emitting unit including a first light source and a second light source;

an analyzing unit configured to analyze a color distribution of an image displayed on the display panel;

a control unit configured to control to light the first light source based on the color distribution analyzed by the analyzing unit and to control to light the second light source based on the color distribution analyzed by the analyzing unit; and a display panel that is illuminated by the light-emitting unit, wherein a color gamut which is determined on the display panel by lighting the second light source is wider than a color gamut which is determined on the display panel by lighting the first light source, wherein a difference between color matching functions of plural visual angles in a peak wavelength of a spectrum of the first light source is smaller than that of the second light source, and wherein in a case where the color distribution of the image analyzed by the analyzing unit is not included in the color gamut which is determined on the display panel by lighting the first light source, the control unit is configured to light the second light source.

4. The image display device according to claim 3, wherein in a case where the color distribution of the image analyzed by the analyzing unit is included in the color gamut which is determined on the display panel by lighting the first light source, the control unit is configured to light only the first light source.

5. An image display device comprising:

a light-emitting unit including a first light source and a second light source;

a display panel that is illuminated by the light-emitting unit;

an acquiring unit configured to acquire a user's color matching function; and a control unit configured to control to light the first light source and to control to light the second light source, wherein a peak wavelength of a spectrum of the first light source is different from that of the second light source, and wherein the control unit is configured to adjust the spectrum of light emitted by the light-emitting unit on the basis of a difference between the user's color matching function and a predetermined standard color matching function by adjusting an emission intensity ratio of the first light source and the second light source.

6. The image display device according to claim 5, wherein the control unit adjusts an emission intensity ratio of the first and second light sources so that a stimulus value calculated using the standard color matching function when light is emitted from the first and second light sources at a predetermined emission intensity ratio and a stimulus value calculated using the user's color matching function when light is emitted from the first and second light sources at the adjusted emission intensity ratio become approximately the same.

7. The image display device according to claim 5, wherein a light emitted by the first light source and a light emitted by the second light source are different with respect to color, and wherein the control unit calculates a deviation in peak wavelengths between the user's color matching function and the standard color matching function for the color, and adjusts the emission intensity ratio so that a peak of a spectrum of the color shifts by an amount corresponding to the calculated deviation in peak wavelengths from a peak when light is emitted from the first light source and the second light source at a predetermined emission intensity ratio.

8. An image display device comprising:

a light-emitting unit that emits light;

a control unit configured to control to light the light-emitting unit;

a display panel that is illuminated by the light-emitting unit; and an acquiring unit for acquiring color matching functions of a plurality of users, wherein the control unit is configured to adjust a peak wavelength of the spectrum of the light emitted by the light-emitting unit to a wavelength at which a variation among the color matching functions of the plurality of users is small.

9. The image display device according to claim 5, wherein a light emitted by the first light source and a light emitted by the second light source are different with respect to color, and wherein the control unit adjusts the spectrum by adjusting an emission intensity ratio of the first light source and the second light source for the color.

* * * * *